United States Patent
Kim et al.

(10) Patent No.: US 11,907,826 B2
(45) Date of Patent: Feb. 20, 2024

(54) ELECTRONIC APPARATUS FOR OPERATING MACHINE LEARNING AND METHOD FOR OPERATING MACHINE LEARNING

(71) Applicant: Samsung Electronics Co., Ltd., Gyeonggi-do (KR)

(72) Inventors: Kyoung-Hoon Kim, Gyeonggi-do (KR); Young-hwan Park, Gyeonggi-do (KR); Ki-seok Kwon, Seoul (KR); Suk-jin Kim, Seoul (KR); Chae-seok Im, Gyeonggi-do (KR); Han-su Cho, Gyeonggi-do (KR); Sang-bok Han, Gyeonggi-do (KR); Seung-won Lee, Gyeonggi-do (KR); Kang-jin Yoon, Seoul (KR)

(73) Assignee: Samsung Electronics Co., Ltd

( * ) Notice: Subject to any disclaimer, the term of this patent is extended or adjusted under 35 U.S.C. 154(b) by 1130 days.

(21) Appl. No.: 15/934,341

(22) Filed: Mar. 23, 2018

(65) Prior Publication Data
US 2018/0276532 A1 Sep. 27, 2018

(30) Foreign Application Priority Data

Mar. 23, 2017 (KR) .................. 10-2017-0036715

(51) Int. Cl.
*G06N 3/045* (2023.01)
*G10L 15/16* (2006.01)
(Continued)

(52) U.S. Cl.
CPC ............. *G06N 3/045* (2023.01); *G06N 3/044* (2023.01); *G06N 3/063* (2013.01); *G06N 20/00* (2019.01); *G10L 15/16* (2013.01)

(58) Field of Classification Search
CPC .... G06N 3/0454; G06N 20/00; G06N 3/0445; G06N 3/063
See application file for complete search history.

(56) References Cited

U.S. PATENT DOCUMENTS

| 4,701,876 A | 10/1987 | McCanny et al. |
| 4,758,999 A | 7/1988 | Marwood et al. |

(Continued)

FOREIGN PATENT DOCUMENTS

| CN | 1862524 | 11/2006 |
| CN | 106203617 | 12/2016 |

(Continued)

OTHER PUBLICATIONS

Zhou, Chunting, et al. "A C-LSTM neural network for text classification." arXiv preprint arXiv:1511.08630 (2015). (Year: 2015).*

(Continued)

*Primary Examiner* — Ying Yu Chen
*Assistant Examiner* — Sidney Vincent Bostwick
(74) *Attorney, Agent, or Firm* — The Farrell Law Firm, P.C.

(57) ABSTRACT

An electronic apparatus for performing machine learning a method of machine learning, and a non-transitory computer-readable recording medium are provided. The electronic apparatus includes an operation module configured to include a plurality of processing elements arranged in a predetermined pattern and share data between the plurality of processing elements which are adjacent to each other to perform an operation; and a processor configured to control the operation module to perform a convolution operation by applying a filter to input data, wherein the processor controls the operation module to perform the convolution operation by inputting each of a plurality of elements configuring a two-dimensional filter to the plurality of processing ele- (Continued)

(a)

(b)

(c)

ments in a predetermined order and sequentially applying the plurality of elements to the input data.

9 Claims, 46 Drawing Sheets

(51) Int. Cl.
  *G06N 3/063* (2023.01)
  *G06N 20/00* (2019.01)
  *G06N 3/044* (2023.01)

(56) References Cited

U.S. PATENT DOCUMENTS

| | | | |
|---|---|---|---|
| 5,274,832 A | 12/1993 | Khan | |
| 5,471,627 A | 11/1995 | Means et al. | |
| 5,784,632 A | 7/1998 | Pechanek et al. | |
| 6,639,537 B1 | 10/2003 | Raz | |
| 9,563,825 B2 | 2/2017 | Shen et al. | |
| 9,805,304 B2* | 10/2017 | Ross | G06N 3/063 |
| 10,140,252 B2* | 11/2018 | Fowers | G06N 3/04 |
| 2005/0147313 A1 | 7/2005 | Gorinevsky | |
| 2006/0277041 A1 | 12/2006 | Stuns | |
| 2008/0298680 A1* | 12/2008 | Miller | G06T 5/20 382/168 |
| 2015/0178246 A1 | 6/2015 | Herrero Abellanas et al. | |
| 2016/0062947 A1 | 3/2016 | Chetlur et al. | |
| 2016/0099010 A1 | 4/2016 | Sainath et al. | |
| 2016/0100193 A1* | 4/2016 | Mishra | G06F 17/16 375/240.2 |
| 2016/0283841 A1 | 9/2016 | Sainath et al. | |
| 2016/0342890 A1* | 11/2016 | Young | G06N 3/08 |
| 2017/0061246 A1 | 3/2017 | Chen et al. | |
| 2017/0264493 A1* | 9/2017 | Cencini | H04L 67/1008 |
| 2017/0316312 A1* | 11/2017 | Goyal | G06N 3/0454 |
| 2021/0182025 A1 | 6/2021 | Shafiee Ardestani et al. | |

FOREIGN PATENT DOCUMENTS

| | | |
|---|---|---|
| CN | 112989267 | 6/2021 |
| JP | 3271186 | 4/2002 |
| JP | 2017-049996 | 3/2017 |
| KR | 10-0442434 | 7/2004 |
| KR | 10-0670766 | 1/2007 |
| WO | WO 2009/149126 | 12/2009 |
| WO | WO 2016/186826 | 11/2016 |

OTHER PUBLICATIONS

Montero, Pablo, et al. "Parallel zigzag scanning and Huffman coding for a GPU-based MPEG-2 encoder." 2010 IEEE International Symposium on Multimedia. IEEE, 2010. (Year: 2010).*
Majumder, Swanirbhar, et al. "SVD and neural network based watermarking scheme." International Conference on Business Administration and Information Processing. Springer, Berlin, Heidelberg, 2010. (Year: 2010).*
Han, Song, et al. "EIE: Efficient inference engine on compressed deep neural network." ACM SIGARCH Computer Architecture News 44.3 (2016): 243-254. (Year: 2016).*
Chen, Yu-Hsin, et al. "Eyeriss: An energy-efficient reconfigurable accelerator for deep convolutional neural networks." IEEE journal of solid-state circuits 52.1 (2016): 127-138. (Year: 2016).*
Liu, Baoyuan, et al. "Sparse convolutional neural networks." Proceedings of the IEEE conference on computer vision and pattern recognition. 2015. (Year: 2015).*
International Search Report dated Jun. 22, 2018 issued in counterpart application No. PCT/KR2018/002725, 7 pages.
Yu-Hsin, et al., "Eyeriss: An Energy-Efficient Reconfigurable Accelerator for Deep Convolutional Neural Networks", IEEE Journal of Solid-State Circuits, 2016, pp. 1-12.
Zidong Du et al., "ShiDianNao: Shifting Vision Processing Closer to the Sensor"ISCA Jun. 13-17, 2015, Portland, OR.
European Search Report dated Nov. 4, 2021 issued in counterpart application No. 18771838.2-1203, 5 pages.
Chinese Office Action dated Mar. 20, 2023 issued in counterpart application No. 201880019678.0, 27 pages.
European Search Report dated Dec. 10, 2019 issued in counterpart application No. 18771838.2-1221, 10 pages.
Chinese Office Action dated Oct. 12, 2023 issued in counterpart application No. 201880019678.0, 27 pages.

* cited by examiner

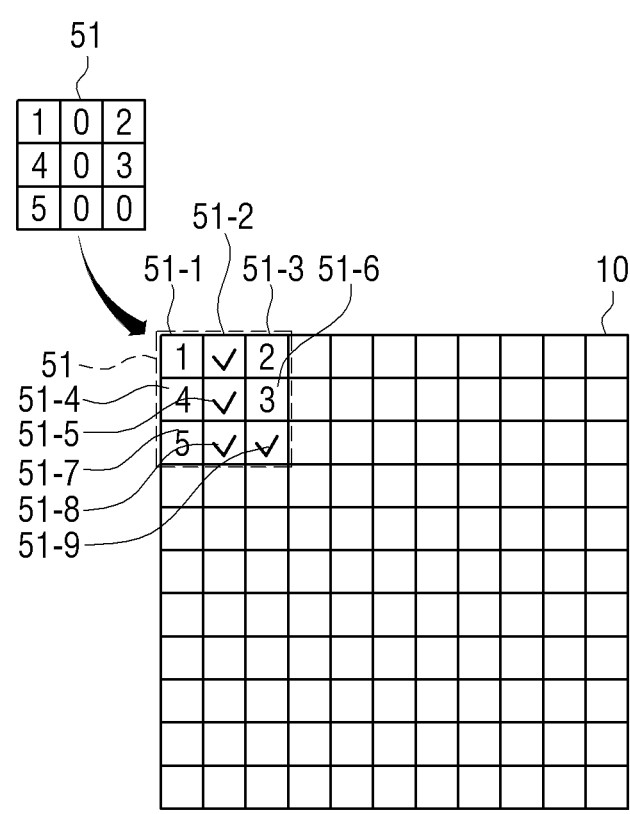

FIG. 7F
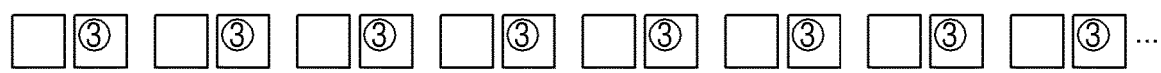
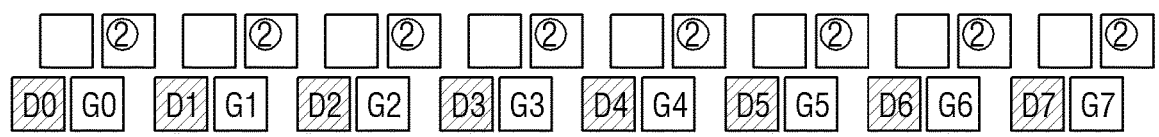
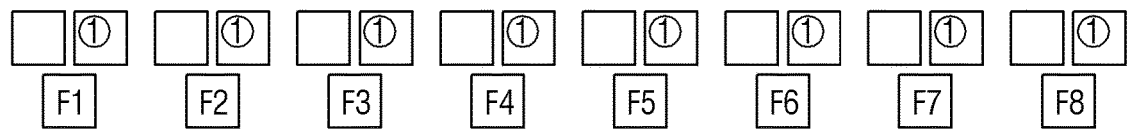

FIG. 7H
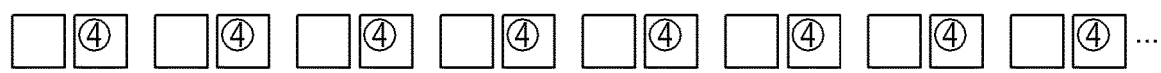
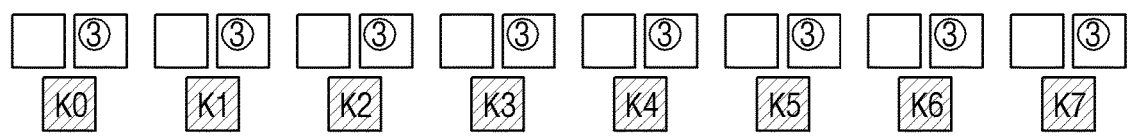
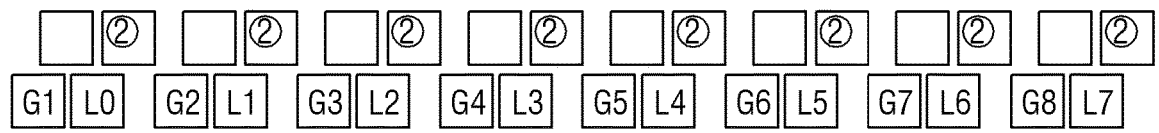
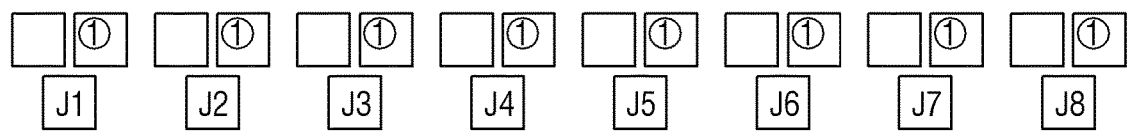

FIG. 8F
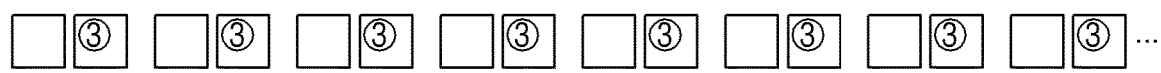
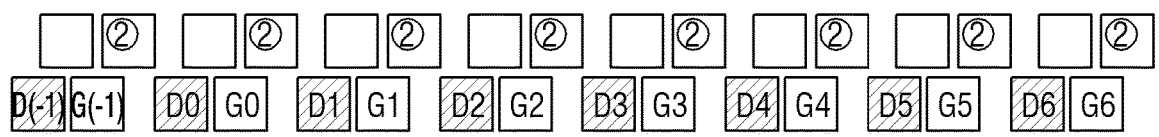
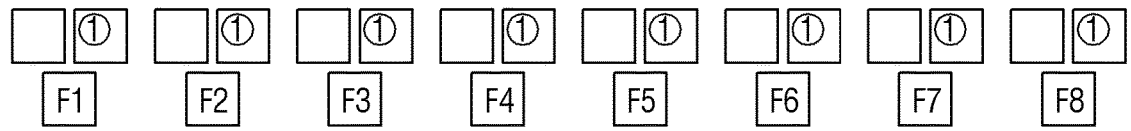

FIG. 8H
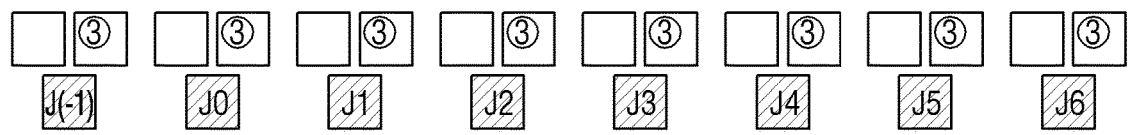
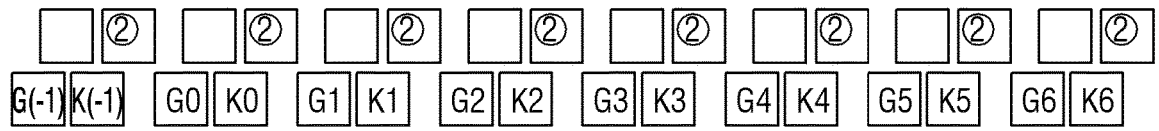
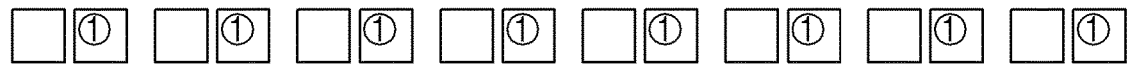

FIG. 11
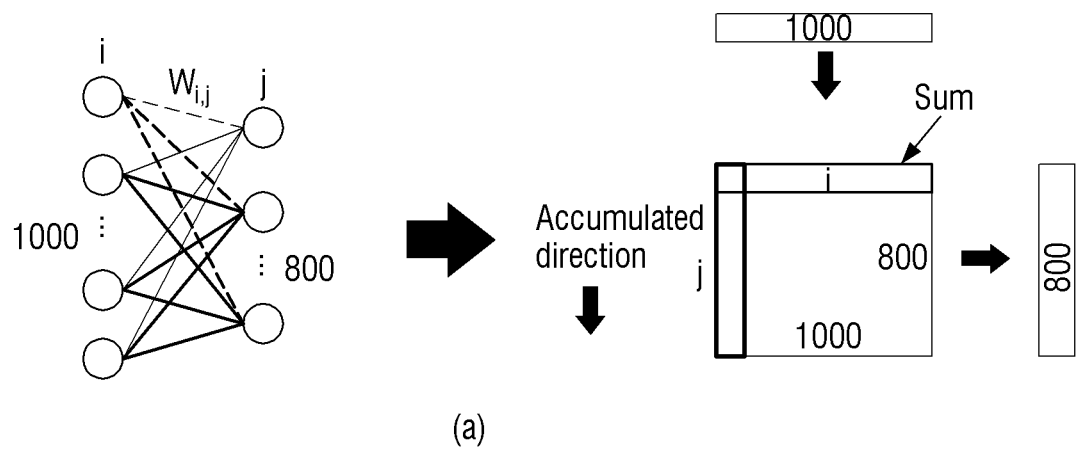
(a)
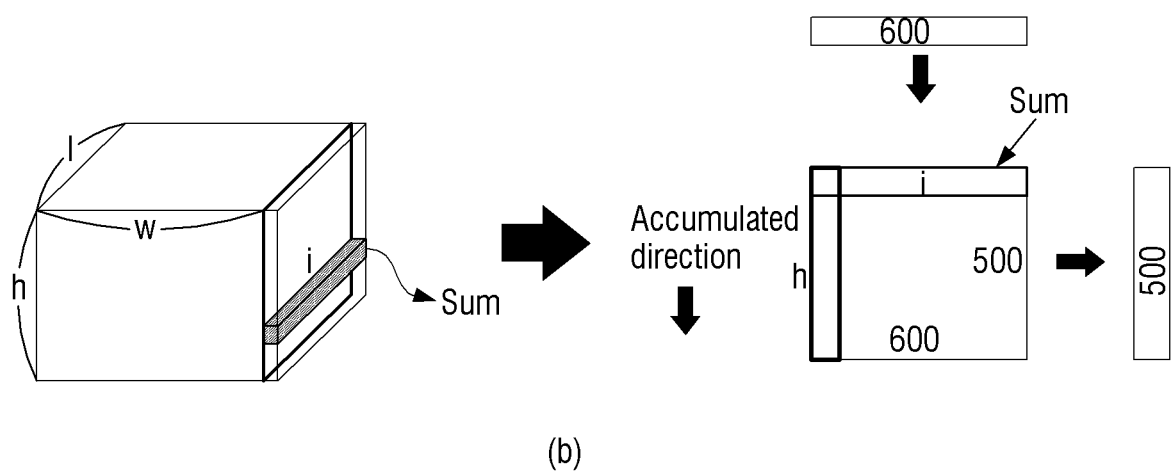
(b)

ELECTRONIC APPARATUS FOR OPERATING MACHINE LEARNING AND METHOD FOR OPERATING MACHINE LEARNING

CROSS-REFERENCE TO RELATED APPLICATIONS

This application is based on and claims priority under 35 U.S.C. § 119 to Korean Patent Application No. 10-2017-0036715, filed on Mar. 23, 2017 in the Korean Intellectual Property Office, the disclosure of which is incorporated by reference herein in its entirety.

BACKGROUND

Field

The disclosure relates to an electronic apparatus for performing machine learning and a method of performing machine learning, and more particularly, to a method of performing an operation according to a neural network used in machine learning.

Description of Related Art

Machine learning, which is a field of artificial intelligence, refers to a technology of researching and constructing a system for collecting and analyzing large-scale big data, predicting the future, improving performance, and an algorithm for such a system.

In accordance with the advancement of hardware technology, as it has recently become possible to collect and store big data and computer ability and technology to analyze big data has become more sophisticated and faster, research on machine learning, which includes an algorithm capable of recognizing objects and understanding information like human, is actively conducted. In particular, in the field of machine learning, research on deep learning of an autonomous learning method using a neural network is actively conducted.

A neural network is an algorithm that determines a final output by comparing, by an activation function, a sum of weights multiplied by a plurality of inputs with a certain boundary value based on an intention to actively mimic the function of the brain of a human being, and generally includes a plurality of layers. Representative examples of a neural network include a convolutional neural network (CNN) widely used for image recognition and a recurrent neural network (RNN) widely used for voice recognition.

However, since a two-dimensional convolution operation is basically performed in the conventional CNN, there is an issue in that it is not efficient in terms of operational speed and usage of memory as unnecessary operations by sparsity of a filter used in the convolution operation occur. Further, there is an issue in that a separate processing element (PE) structure is required because paths of PEs transmitting each data are different depending on CNN and RNN.

SUMMARY

In accordance with an aspect of the disclosure an electronic apparatus is provided that provides an integrated PE structure that simultaneously supports a convolution operation method for increasing operational efficiency and operations by CNN and RNN, in performing the operations by CNN and RNN, and a method for performing machine learning.

According to an aspect of the present disclosure, an electronic apparatus for performing machine learning is provided. The electronic apparatus includes an operation module configured to include a plurality of processing elements arranged in a predetermined pattern and share data between the plurality of processing elements which are adjacent to each other to perform an operation; and a processor configured to control the operation module to perform a convolution operation by applying a filter to input data, wherein the processor controls the operation module to perform the convolution operation by inputting each of a plurality of elements configuring a two-dimensional filter to the plurality of processing elements in a predetermined order and sequentially applying the plurality of elements to the input data.

According to another aspect of the present disclosure, a method of performing machine learning using an operation module configured to include a plurality of processing elements arranged in a predetermined pattern and share data between the processing elements which are adjacent to each other to perform an operation is provided. The method includes receiving input data; and performing a convolution operation by applying a filter to the input data, wherein convolution operation is performed by inputting each of a plurality of elements configuring a two-dimensional filter to the plurality of processing elements in a predetermined order and sequentially applying the plurality of elements to the input data.

According to another aspect of the present disclosure, a non-transitory computer-readable recording medium having a program stored thereon is provided, the program for performing machine learning using an operation module configured to include a plurality of processing elements arranged in a predetermined pattern and share data between the processing elements which are adjacent to each other to perform an operation. The program includes receiving input data; and performing a convolution operation by applying a filter to the input data, wherein the convolution operation is performed by inputting each of a plurality of elements configuring a two-dimensional filter to the plurality of processing elements in a predetermined order and sequentially applying the plurality of elements to the input data.

BRIEF DESCRIPTION OF THE DRAWINGS

The above and other aspects, features, and advantages of the present disclosure will be more apparent from the following detailed description, taken in conjunction with the accompanying drawings, in which:

FIG. 5 is an illustration of an issue of a convolution method according to a conventional CNN;

FIGS. 7A, 7B, 7C, 7D, 7E, 7F, 7G 7H, 7I, and 7J are illustrations of a convolution method according to a CNN, according to an embodiment of the present disclosure;

FIGS. 8A, 8B, 8C, 8D, 8E, 8F, 8G 8H, 8I, 8J, 8K, 8L, 8M, and 8N are illustrations of a convolution method according to a CNN, according to an embodiment of the present disclosure;

FIG. 11 is an illustration of a method of performing an operation by a full connection and a convolution operation of a 1×1 kernel using an integrated network structure of a PE, according to an embodiment of the present disclosure;

DETAILED DESCRIPTION OF EXEMPLARY EMBODIMENTS OF THE PRESENT DISCLOSURE

Figure 1:
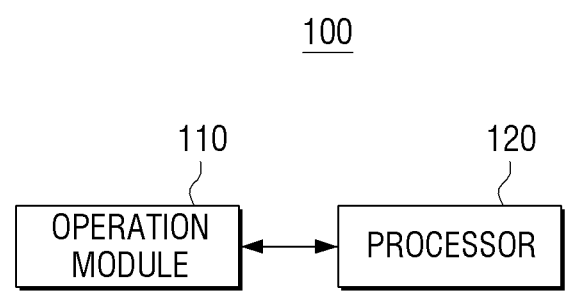
FIG. 1 is a block diagram of an electronic apparatus, according to an embodiment of the present disclosure.

A method of the present disclosure and the accompanying drawings are described below.

Terms used in the present disclosure have been selected by considering functions in embodiments of the present disclosure. However, such terms may vary depending on an intention of those skilled in the art, a legal or technical interpretation, an emergence of a new technology, and the like. Further, some terms may be terms which are arbitrarily selected. Such terms may be interpreted as defined in the present disclosure, but may also be interpreted based on the present disclosure and a typical technical concept in the art unless the terms are not defined.

Further, the same reference numerals or symbols described in the accompanying drawings of the present disclosure denote parts or components that perform substantially the same function. For convenience of explanation and understanding, the description is provided using the same reference numerals or symbols in different embodiments. That is, although a plurality of the accompanying drawings illustrate all of the components having the same reference numeral, the plurality of the accompanying drawings do not indicate one embodiment.

In addition, in order to distinguish components, terms including an ordinal number such as "first", "second", etc. may be used in the present disclosure. An ordinal number is used to distinguish the same or similar components from each other, and the definitions of the terms are not intended to be limited to the usage of the above-described ordinal number. For example, components designated by an ordinal number are not intended to be limited by the number to a use order, a layout order, or the like. Ordinal numbers may be used interchangeably.

In the present disclosure, a singular expression includes a plural expression unless the context clearly indicates otherwise. In the present disclosure, the terms "include" and "consist of" designate the presence of features, numbers, steps, operations, components, elements, or a combination thereof that are described in the present disclosure, are intended to be understood that they do not exclude the presence or possibility of addition of one or more other features, numbers, steps, operations, components, elements, or a combination thereof.

The terms "module", "unit", "part", and the like, in the present disclosure are terms for referring to a component performing at least one function or operation, where such a component may be implemented in hardware, software, or a combination of hardware and software. In addition, a plurality of "modules", "units", "parts", or the like may be integrated into at least one module or integrated circuit and may be implemented in at least one processor, except for a case in which they must each be implemented in individual hardware.

In addition, in an embodiment of the present disclosure, it will be understood that when an element is referred to as being "connected to" another element, it can be directly "connected to" the other element or other elements intervening therebetween may be present. In addition, unless explicitly described otherwise, "comprising" any components will be understood to imply the inclusion of other components rather than the exclusion of any other components.

Hereinafter, the present disclosure is described in detail with reference to the accompanying drawings.

FIG. 1 is a block diagram of an electronic apparatus 100 according to an embodiment of the present disclosure.

Referring to FIG. 1, the electronic apparatus 100 for performing machine learning includes an operation module 110 and a processor 120.

The operation module 110 is configured to include a plurality of PEs. The plurality of PEs are configured in an array structure of a predetermined pattern to parallel-process data between PEs which are synchronously adjacent to each other, and simultaneously perform the same function. A PE may perform an operation and exchange data between PEs, and may be synchronized with one clock to perform an operation. That is, the plurality of PEs may each perform the same operation for each of the clocks. Since the plurality of PEs share data with the PE which is adjacent thereto on the same path, a connection structure between the PEs may form a geometrically simple symmetrical structure.

For example, PEs may be arranged in various forms of network structures such as a mesh topology network, a tree topology network, and the like. A structure of the mesh topology network and the tree topology network are described below with reference to FIGS. 3 and 9.

Figure 2:
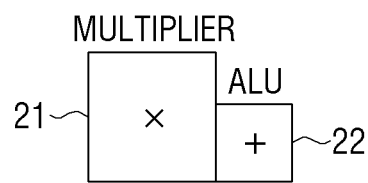
FIG. 2 is a block diagram of a PE, according to an embodiment of the present disclosure.

FIG. 2 is a block diagram of a PE, according to an embodiment of the present disclosure.

Referring to FIG. 2, a PE may basically include a pair of multipliers 21 and an arithmetic logic unit (ALU) 22, and the ALU 22 may include at least one adder. A PE may perform four fundamental arithmetic operations using the multiplier 21 and the ALU 22.

The processor 120 in FIG. 1 is configured to control an overall operation of the electronic apparatus 100. For example, the processor 120 may perform an operation by a neural network used for image classification, image recognition, voice recognition, natural language processing, and the like using the operation module 110 in FIG. 1.

For example, the processor 120 may control the operation module 110 to perform a convolution operation based on a neural network by applying a filter to input data which is input to the operation module 110. In this case, the filter, which is a mask having a weight, is defined as a matrix. The filter is also referred to as a window or a kernel.

For example, in a CNN for mainly processing an image, the processor 120 may put the filter having the weight on the input image and determine a sum (convolution operation) of the product of the image and the weight of the filter as a pixel value of an output image, thereby extracting a feature map. A plurality of input images may be extracted through multiple filters to extract robust characteristics, and a plurality of feature maps may be extracted according to the number of filters. Such a convolution image may be repeated by multiple layers.

As such, the processor 120 may determine the type of characteristics of original input data by combining multiple filters capable of extracting different characteristics and applying the characteristics to the CNN.

In addition, the processor 120 according to an embodiment of the present disclosure may control the operation module 110 to perform a convolution operation by inputting a plurality of elements configuring a filter which is implemented in two dimensions to the operation module 110 in a predetermined order and sequentially applying the plurality of input elements to the input data. In this case, each of the plurality of elements is one-dimensional data which is arranged in a predetermined order, and the processor 120 performs the convolution operation by applying each of the plurality of elements to two-dimensional or three-dimensional input data. A description thereof is described below in greater detail with reference to the accompanying drawings.

Figure 3:
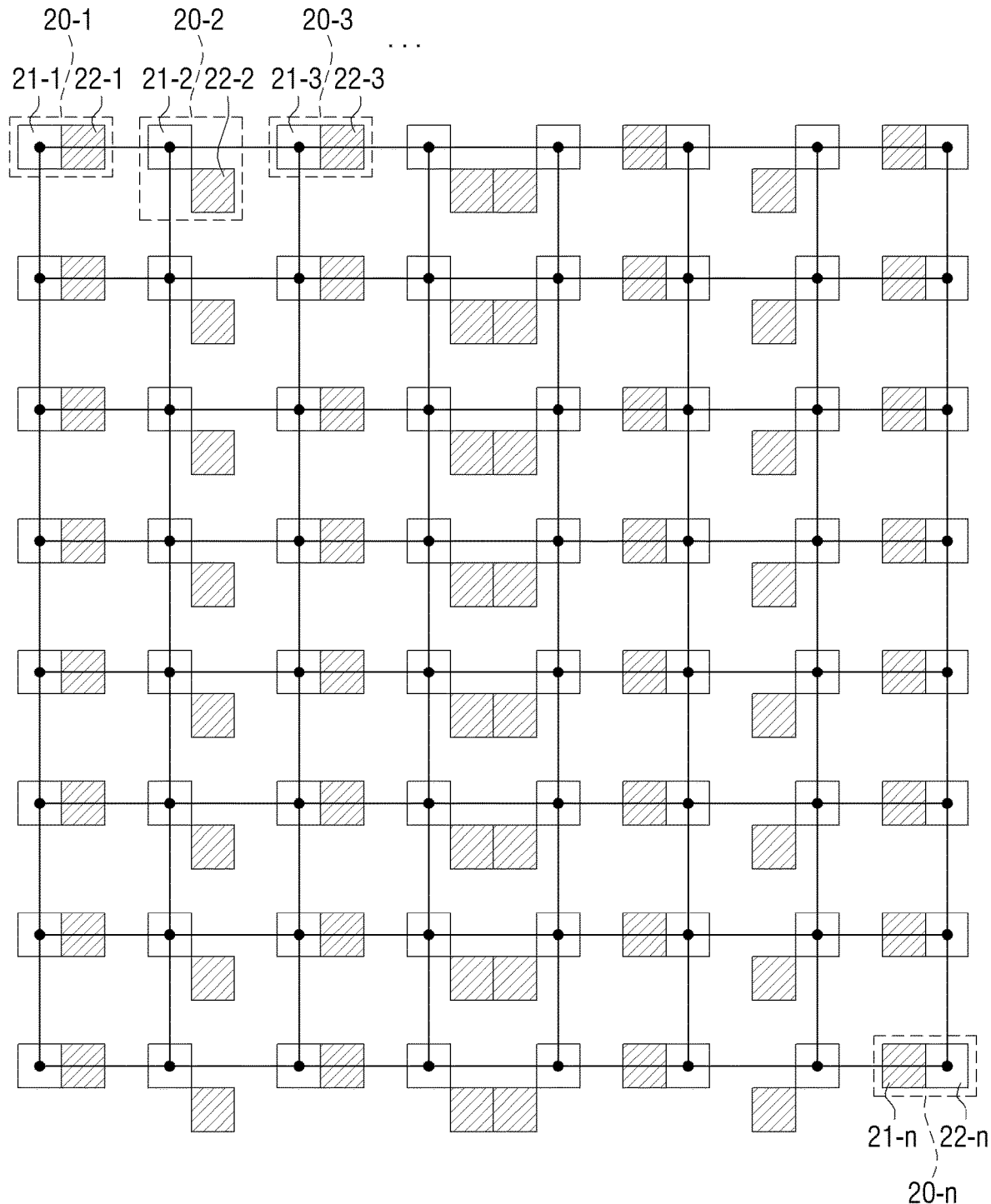
FIG. 3 is an illustration of a network structure of a PE for performing a convolution operation, according to a CNN.

FIG. 3 is an illustration of a network structure of a PE for performing a convolution operation according to a CNN.

Referring to FIG. 3, a plurality of PEs 20-1 to 20-*n* included in the operation module 110 form a systolic array of a mesh topology network structure. The plurality of PEs 20-1 to 20-*n* may share data through lines connecting the PEs 20-1 to 20-*n* which are adjacent to each other to perform the operation, using the mesh topology network structure. The mesh topology network structure is a structure in which respective PEs may be connected to the PEs which are adjacent thereto in a mesh network to exchange data, as illustrated in FIG. 3.

Each of the plurality of PEs 20-1 to 20-*n* may include multipliers 21-1 to 21-*n* and ALUs 22-1 to 22-*n*, and values operated on by the respective multipliers 21-1 to 21-*n* and ALUs 22-1 and 22-*n* may be transferred to an adjacent PE to perform the operation.

Figure 4A:
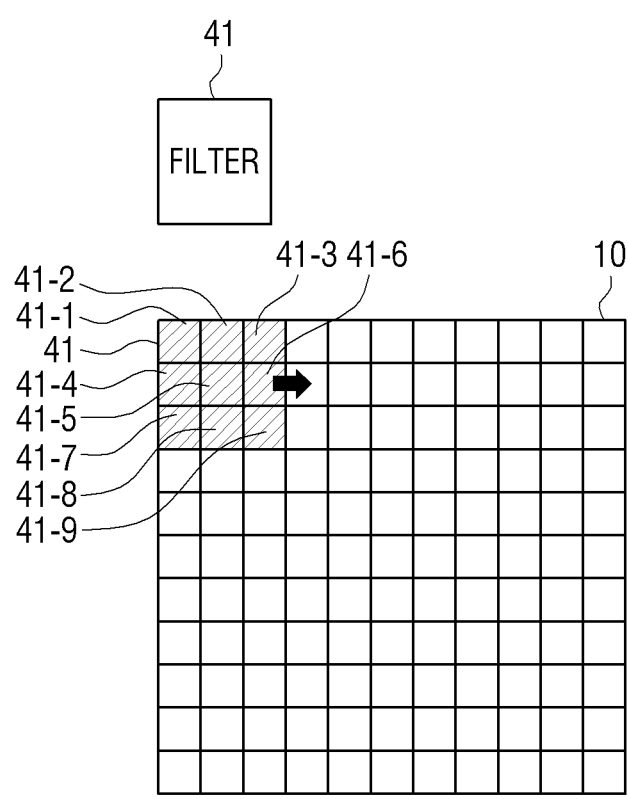
FIGS. 4A, 4B, and 4C are illustrations of a convolution method according to a conventional CNN.
Figure 4B:
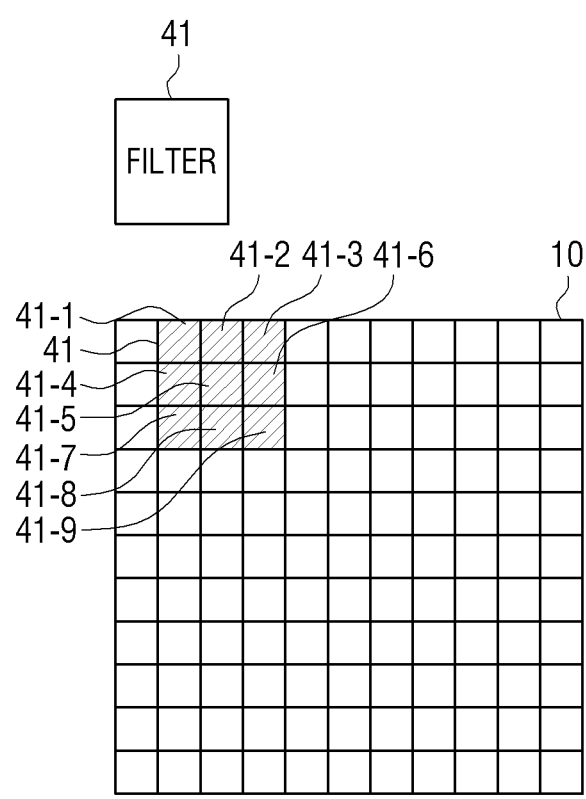
Figure 4C:
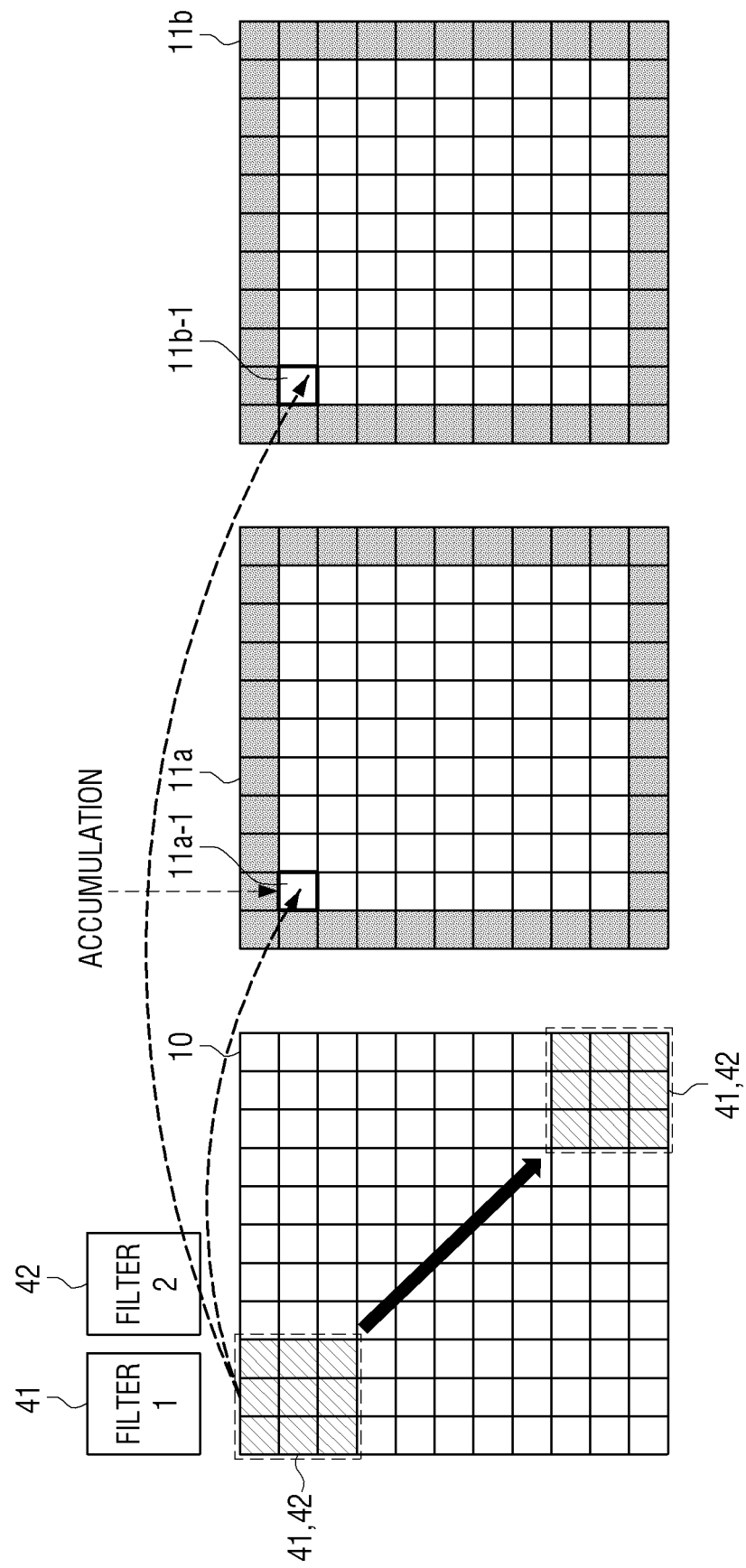

FIGS. 4A, 4B, and 4C are illustrations of a convolution operation method according to the conventional CNN.

Referring to FIGS. 4A, 4B, and 4C, FIG. 4A illustrates the conventional method for performing a convolution operation according to the CNN by applying a two-dimensional filter 41 to two-dimension input data, where the input data and the filter 41 may be formed of matrix data including elements having one or more certain values. The convolution is performed as a sum of values obtained by multiplying each element (e.g., a pixel) of the input data and its surrounding elements by a weight, where the filter 41 refers to a matrix of weights used in calculating such a sum. The filter 41 is also referred to as a kernel or a window. The filter 41 may be implemented in various forms depending on its function.

Hereinafter, input data is data of an image format. However, the present disclosure is not limited thereto.

As illustrated in FIG. 4A, a slice 10, which is a portion to be multiplied with the filter 41, is extracted from the input image, and the filter 41 is applied to the slice 10. In this case, the slice 10 extracted from the input image is referred to as a feature map. In this case, the filter 41 is applied to the slice 10 while being moved by one space across the slice 10. For example, when a slice 10 of 10×10 is present, a filter of 3×3 is applied to the left of the slice 10 from an upper left end by one space, and is again applied to the left of the slice 10 by one space on the next row.

While the filter 41 moves, the respective elements 41-1 to 41-9 of the filter 41 are each multiplied by elements corresponding to elements in the slice 10, and a value obtained by summing the multiplied values is output as the filter 41 moves. The output results form a matrix, and a convolution operation is repeatedly performed for the feature map, which is the output result, through another filter. Pooling, which is a sampling process, is performed as needed, and padding may be applied to prevent an output value from being missed in such a process.

FIG. 4C illustrates a process of outputting a first feature map 11*a* and a second feature map 11*b* by each applying a first filter 41 and a second filter 42 which are different from each other to the slice 10. Elements which are present at the outermost portion of the feature maps 11*a* and 11*b* are elements generated by padding, where a value at which the convolution operation is first performed in the slice 10 becomes each of the first elements 11*a*-1 and 11*b*-1 except for the padding region in the first and second feature maps 11*a* and 11*b*.

When feature values are finally extracted from the convolution layer of the CNN, in a fully connected layer, the extracted feature values are input to the neural network to perform a classification.

FIG. 5 is an illustration of an issue of a convolution method according to the conventional CNN.

Referring to FIG. 5, the convolution method illustrated in FIGS. 4A and 4B has an issue in that operation efficiency is low. As illustrated in FIG. 5, a filter 51 may include elements 51-2, 51-5, 51-8, and 51-9 having a zero value among a plurality of elements 51-1 to 51-9.

In a case in which the two-dimensional filter 51 of 3×3 is directly applied to the feature map 10, since it is necessary to perform an unnecessary operation on the elements having a zero value in the convolution process, there are issues of an unnecessary operation that does not affect the derivation of the result and a decrease in efficiency due to an increase in memory usage.

Figure 6:
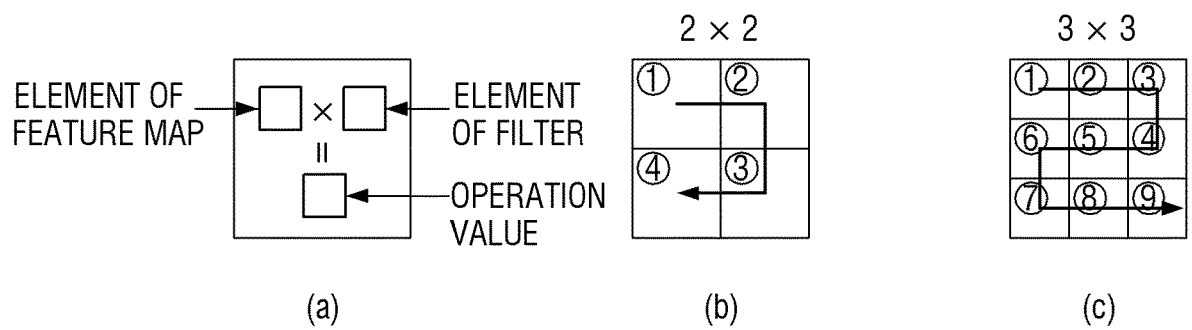
FIG. 6 is an illustration of an input order of a filter for a PE, according to an embodiment of the present disclosure.

FIG. 6, in panels (a), (b), and (c), illustrates a convolution method according to an embodiment of the present disclosure to overcome an inefficiency problem caused by applying the two-dimensional filter 51 described above. For example, FIG. 6 illustrates an input order of the filter to the PE.

Referring to FIG. 6, in panel (a), in a single PE, a value obtained by multiplying each element of the feature map and the element of the filter by the multiplier is output as a value. In this case, the filter input to the operation module 110 is not directly applied to data of a two-dimensional matrix format, but is divided into elements which are each one-dimensional data configuring the filter and are sequentially input to the operation module 110. That is, it is the same principle as a one-dimensional filter applied to a two-dimensional feature map.

For example, the processor 120 may control the operation module 110 to perform the convolution operation by the CNN by inputting each of the plurality of elements configuring the two-dimensional filter to a plurality of processing elements in a predetermined order and sequentially applying the plurality of elements to the feature map. In this case, the processor 120 may input each of the remaining elements that do not have a zero value to the operation module 110 in a predetermined order, except for the elements having a zero value among the plurality of elements, while dividing the two-dimensional filter into the plurality of elements.

FIG. 6 illustrates the order in which the elements of the two-dimensional filter are input to the operation module 110, according to an embodiment of the present disclosure. A basic input order is repeated in the order of proceeding in one side direction based on a certain element in the two-dimensional filter, proceeding to an element which is adjacent to a corresponding element in a next row or a next column of the element positioned at the end of the proceeding direction, and proceeding in a direction opposite to one side direction in the adjacent element. In panel (b) of FIG. 6, elements ① to ④ are input to the operation module 110 in the order of the numbers. In panel (c) of FIG. 6, elements ① to ⑨ are input to the operation module 110 in the order of the numbers.

A detailed convolution method according to FIG. 6 is described below in greater detail with reference to FIGS. 7A, 7B, 7C, 7D, 7E, 7F, 7G 7H, 7I, and 7J.

FIGS. 7A, 7B, 7C, 7D, 7E, 7F, 7G 7H, 7I, and 7J are illustrations of a method of performing a convolution operation according to a CNN using a two-dimensional filter of 2×2, according to an embodiment of the present disclosure in detail.

Figure 7A:
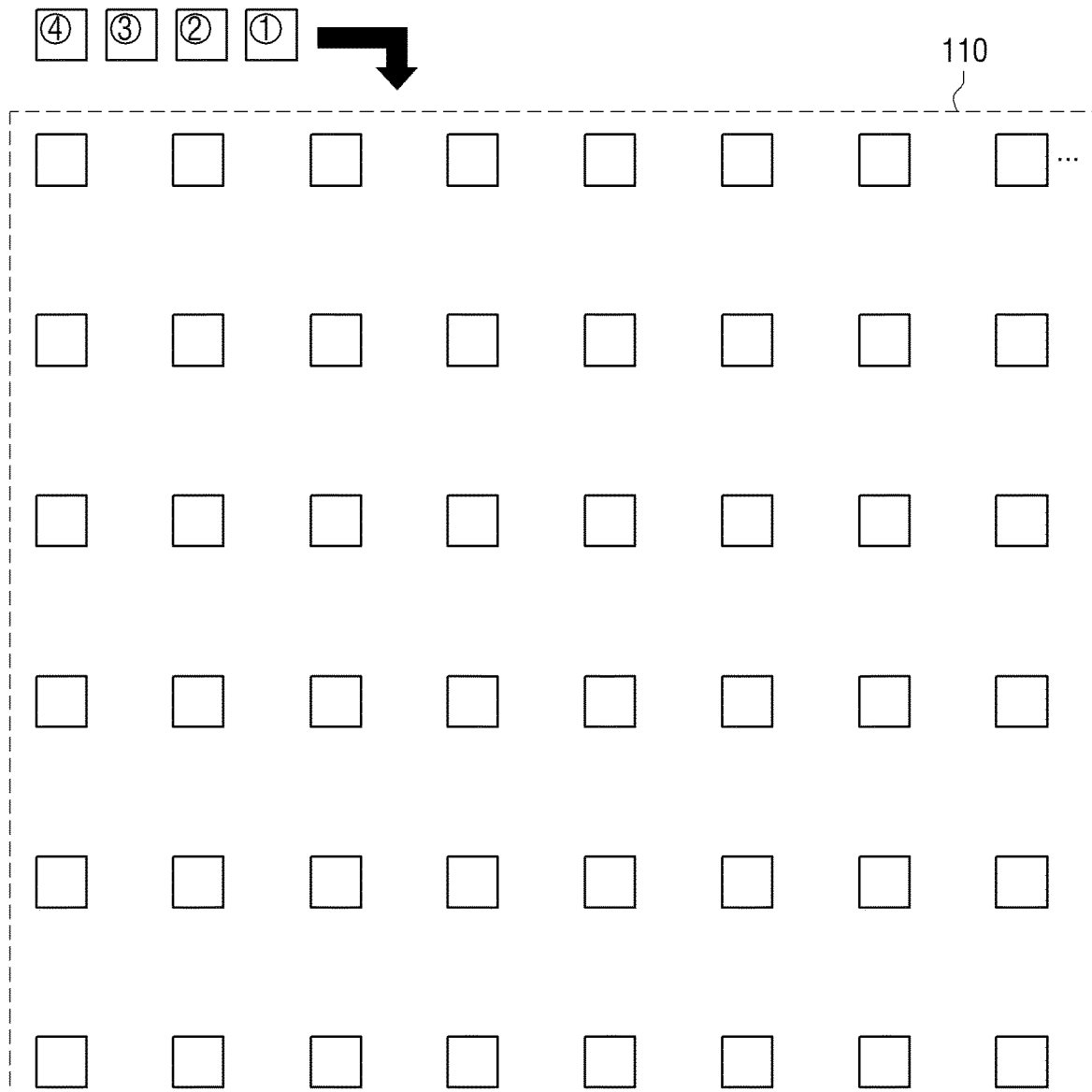

Referring to FIG. 7A, in panel (a), when it is assumed that a filter 70 of 2×2 that does not include the zero value is applied to a feature map, the processor 120 may divide the filter 70 into four elements and sequentially input the four elements to the operation module 110 illustrated in panel (b) of FIG. 7A. In this case, the operation module 110 is configured so that each element of the feature map may be mapped and input to the PE of the mesh topology network structure at a ratio of 1 to 1 (1:1).

Figure 7B:
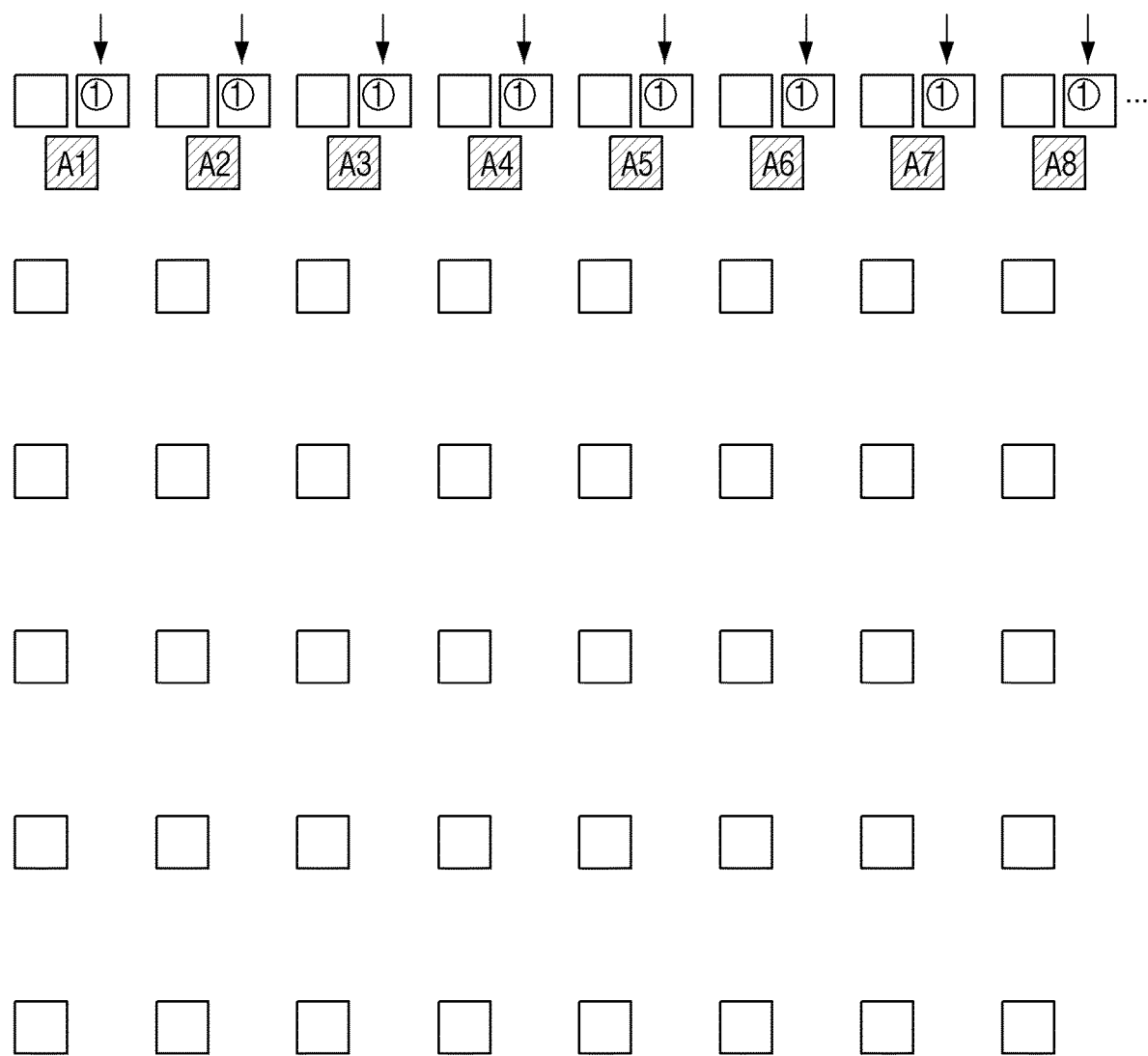

Referring to FIG. 7B, at a first clock, an element ① is input to each PE included in a first row of the operation module 110. The respective elements of the filter 70 input to the operation module 110 sequentially proceed in one direction of the operation module 110, and the processor 120 may perform an operation of multiplying the element among the elements configuring the filter 70 with each of the plurality of first data values belonging to the first row of the input feature map, and may perform an operation of multiplying the element ① with each of the plurality of second data values belonging to a second row of the feature map. That is, the respective PEs to which the element ① is input may derive result values A1 to A8 for a product of the element ① and the element of the feature map corresponding to each of the PEs.

In addition, the processor 120 may control the operation module 110 to perform the convolution operation by transferring different data values of the input data, that is, accumulation for the values obtained by multiplying different element values of the feature map with each of the elements of the filter 70 to an adjacent PE. That is, the respective elements of the filter 70 which are divided in one dimension are transferred between the PEs and the accumulation of each element of the filter and the data value of the feature map is performed, thereby making it possible to perform the same operation as the convolution operation by the conventional two-dimensional filter 70.

For example, the processor 120 performs an operation of multiplying a first element of the plurality of elements of the filter 70 with each of the plurality of first data values belonging to the first row of the input data, and performs an operation of multiplying the first element with each of a plurality of second data values belonging to a second row of the input data. Further, an operation of multiplying a second element of the plurality of elements of the filter 70 with each of the plurality of first data values is performed, and an operation of multiplying the second element with each of the plurality of second data values is performed. Such an operation is repeated for all elements of the filter 70.

When the operation of the first elements is completed in the first row and the operation for the second elements starts, the processor 120 then shifts a plurality of values for the first elements in a predetermined direction to perform the accumulation for the values. In this case, the predetermined direction is the same as a direction in which the second elements are disposed based on the first elements in the two-dimensional filter.

Figure 7C:
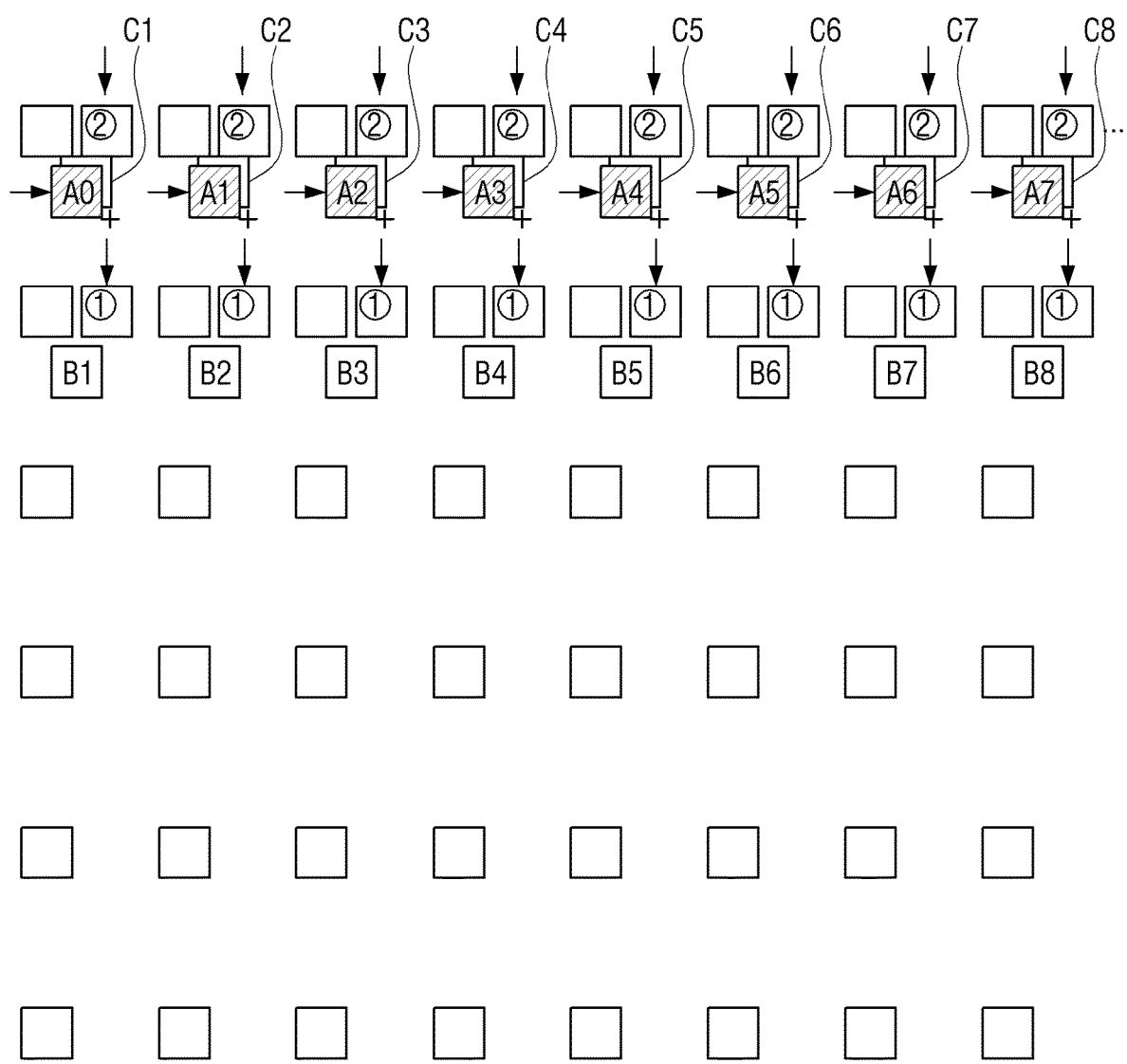

Referring to FIG. 7C, at a next clock, the element ② is input to each PE included in the first row of the operation module 110, and the element ① is input to each PE included in a second row. In this case, result values B1 to B8 obtained by multiplying the element ① and each of the elements of the feature map mapped to the PE of the second row may be derived. Further, result values C1 to C8 obtained by multiplying the element ② and the elements of the feature map mapped to the PE of the first row may also be derived.

In this case, an accumulation operation in which A1 to A8 derived at the previous clock are moved to the PE which is adjacent to the right by one space and are each summed to C1 to C8 is performed. A direction in which the accumulation operation is performed is the same as a direction (a direction of an arrow in FIG. 7A, in panel (a)) corresponding to the numbered order in the filter 70. As illustrated in FIG. 7C, C1 to C8 are each summed to A0 to A7.

Figure 7D:
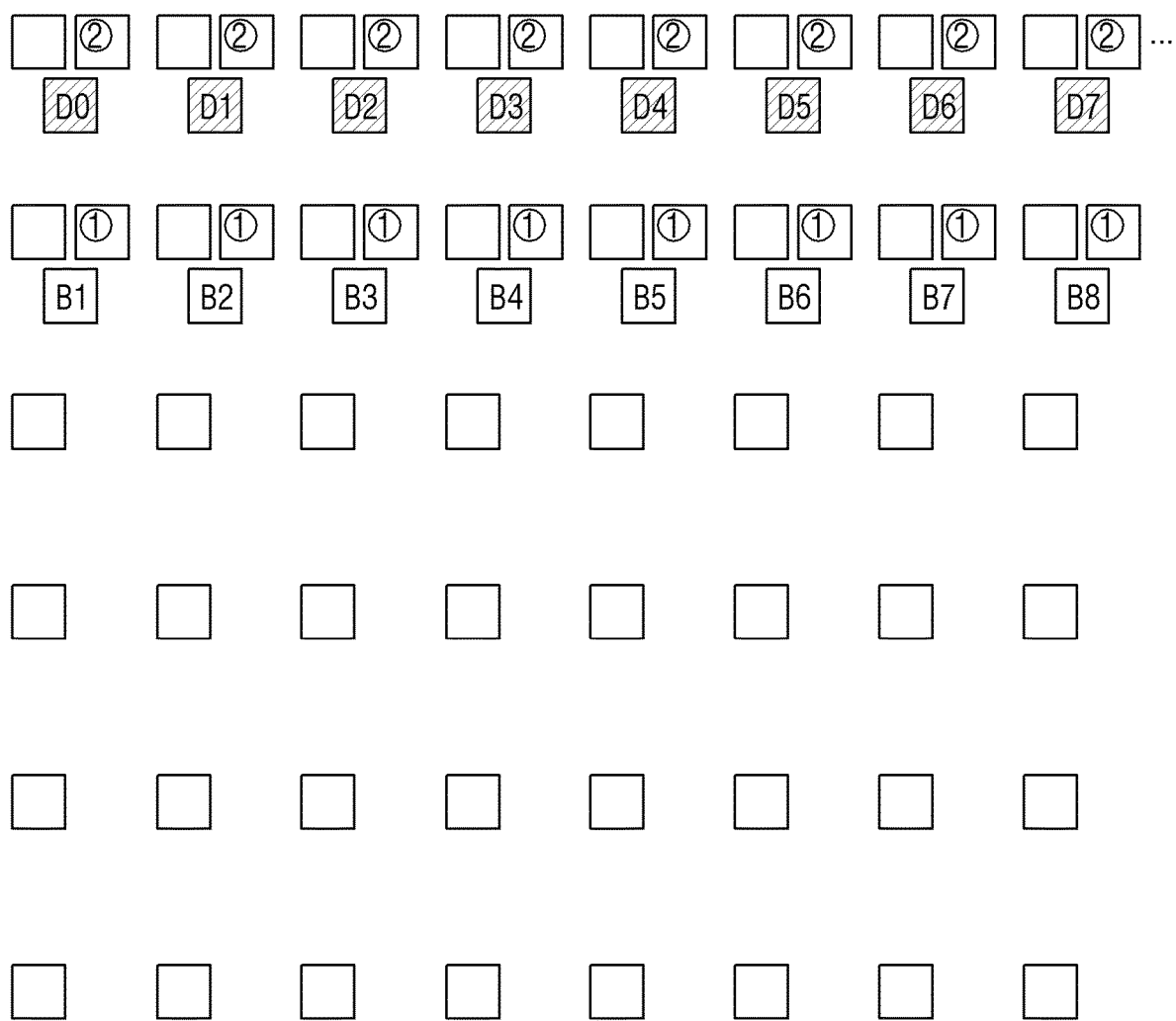

Referring to FIG. 7D, first accumulation values D0 to D7 are illustrated in which C1 to C8 are each summed to A0 to A7.

Figure 7E:
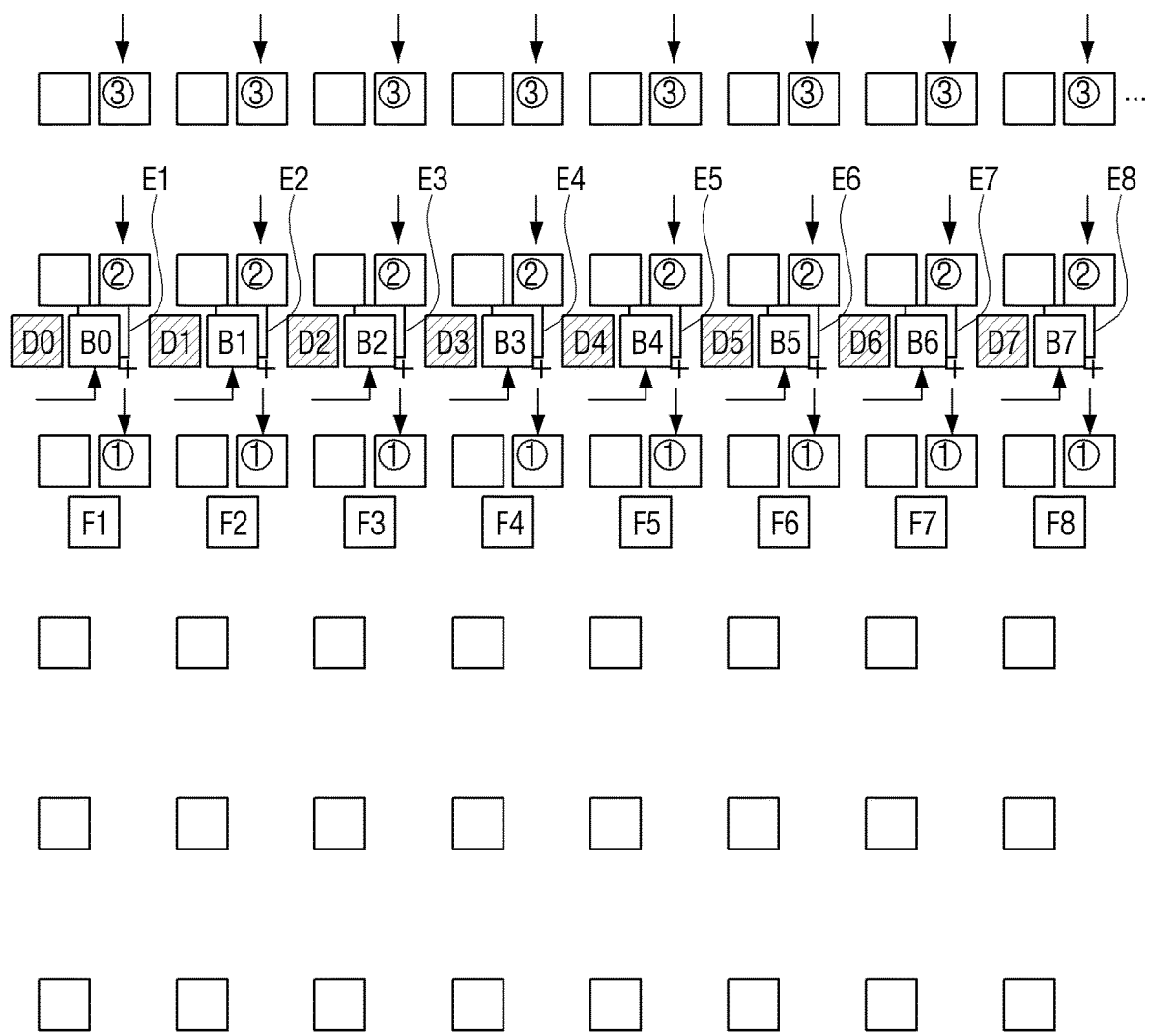

Referring to FIG. 7E, at a next clock, the element ③ is input to each PE included in the first row of the operation module 110, the element ① is input to each PE included in a third row, and the element ② is input to each PE included in a second row. In this case, result values F1 to F8 obtained by multiplying the element ① and each of the elements of the feature map mapped to the PE of the third row may be derived. Further, result values E1 to E8 obtained by multiplying the element ② and the elements of the feature map mapped to the PE of the second row may also be derived. The element ③ is multiplied with the elements of the feature map mapped to the PE of the first row.

In addition, the first accumulation values D0 to D7 derived at the previous clock may be moved to the PE adjacent to a lower end by one space and may be each temporarily stored in a memory included in the PE of the second row (to this end, each PE may include the memory) At the same time, an accumulation operation in which B1 to B7 derived at the previous clock are moved to the PE adjacent to the right by one space similarly to A1 to A8 at the previous clock and are each summed to E1 to E8 is performed. That is, the accumulation according to a direction (a direction in which an arrow is moved in FIG. 7A, in panel (a)) corresponding to the numbered order in the filter 70 for each of the PEs of each row may be separately performed.

Referring to FIG. 7F, accumulation values G0 to G7 are illustrated in which E1 to E8 are each summed to B0 to B7.

Figure 7G:
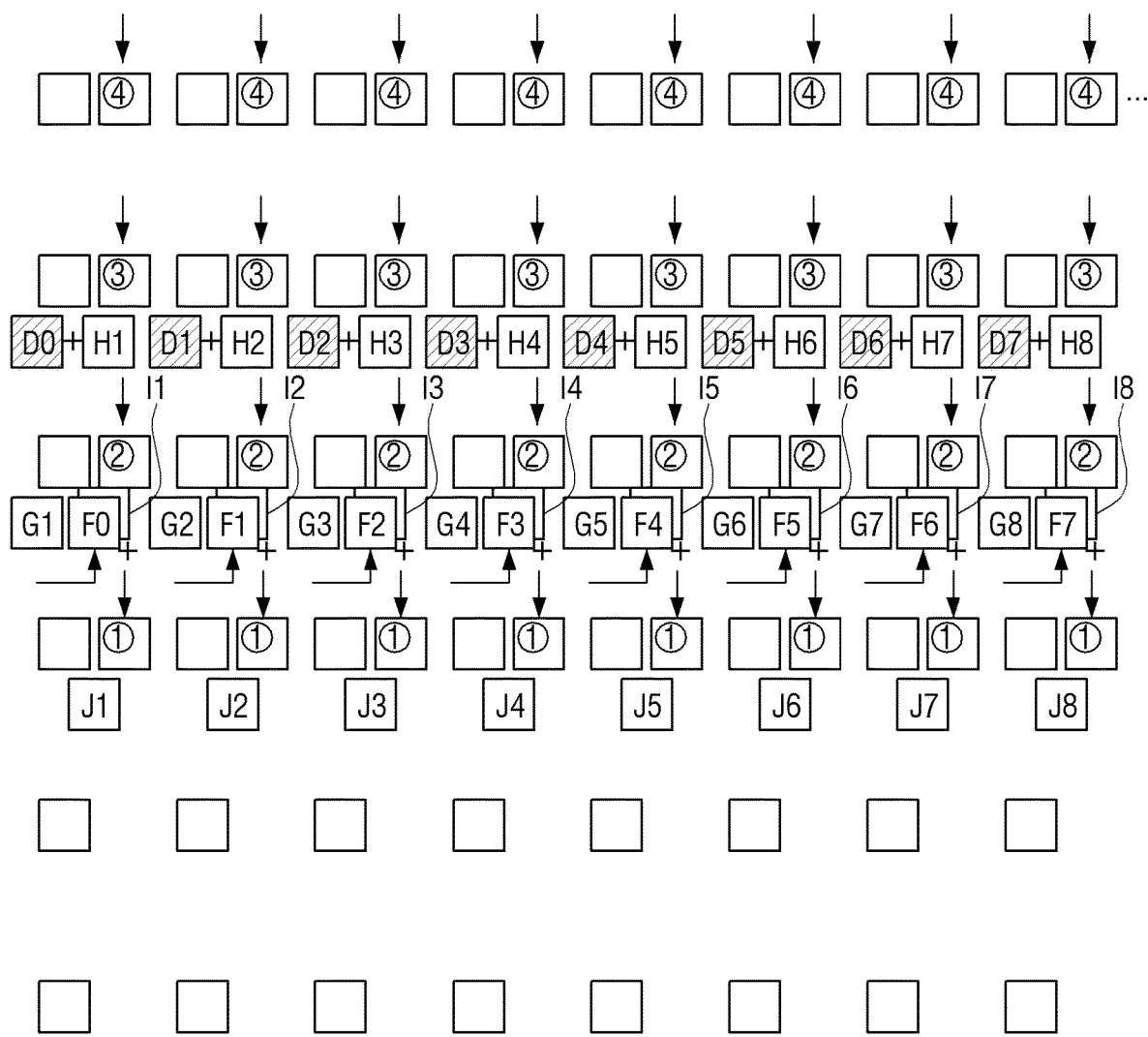

Referring to FIG. 7G, thereafter, at the next clock, an element ④, which is the last element of the filter 70, is input to each PE included in the first row of the operation module 110, the element ①is input to each PE included in a fourth row, the element ②is input to each PE included in the third row, and the element ③ is input to each PE included in the second row. In this case, result values $J_1$ to $J_8$ obtained by multiplying the element ① and each of the elements of the feature map mapped to the PE of the fourth row may be derived. Further, result values I1 to I8 obtained by multiplying the element ② and the elements of the feature map mapped to the PE of the third row, and result values H1 to H8 obtained by multiplying the element ③ and the elements of the feature map mapped to the PE of the second row are also derived. The element ④ is multiplied with the elements of the feature map mapped to the PE of the first row.

Referring to FIG. 7H, an accumulation operation in which the accumulation values D1 to D7 derived at the previous clock are each summed to H1 to H8 is performed, thereby making it possible to drive second accumulation values K0 to K7. L1 to L7 of the third row denotes values in which F0 to F7 move to the PE adjacent to the right by one space are each summed to I1 to I8.

Figure 7I:
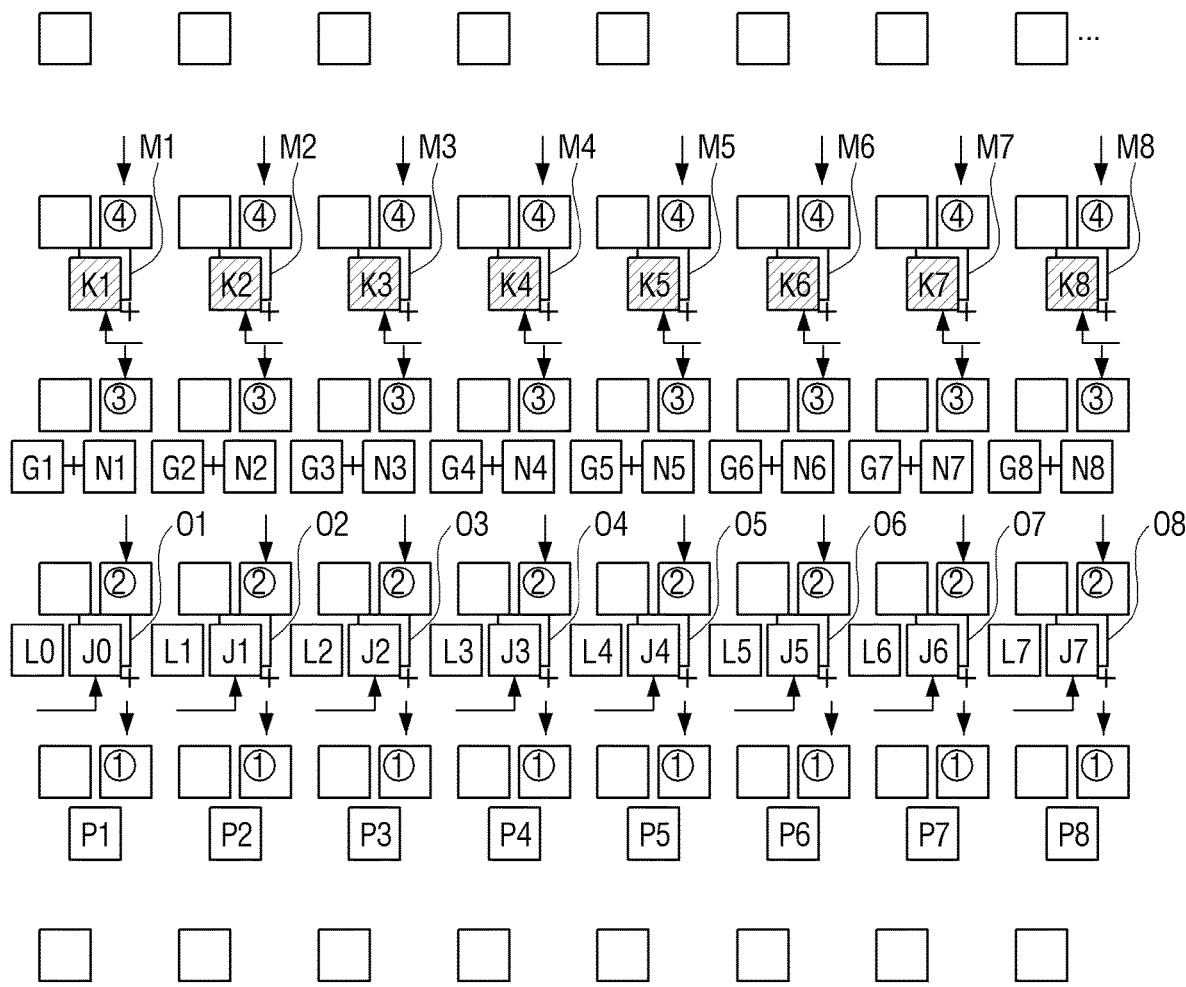

Referring to FIG. 7I, thereafter, at the next clock, the element ① is input to each PE included in a fifth row, the element ② is input to each PE included in a fourth row, the element ③ is input to each PE included in a third row, and the element ④ is input to each PE included in a second row. In this case, result values M1 to M8 obtained by multiplying the element ④ and each of the elements of the feature map mapped to the PE of the second row may be derived. In this case, an accumulation operation in which the second accumulation values K1 to K8 derived at the previous clock are moved to the PE adjacent to the left by one space and are each summed to M1 to M8 may be performed. Hereinafter, the element①, the element ②, and the element ③ each perform a separate accumulation operation in the third row, the fourth row, and the fifth row of the operation module 110, as illustrated in FIG. 7I.

Figure 7J:
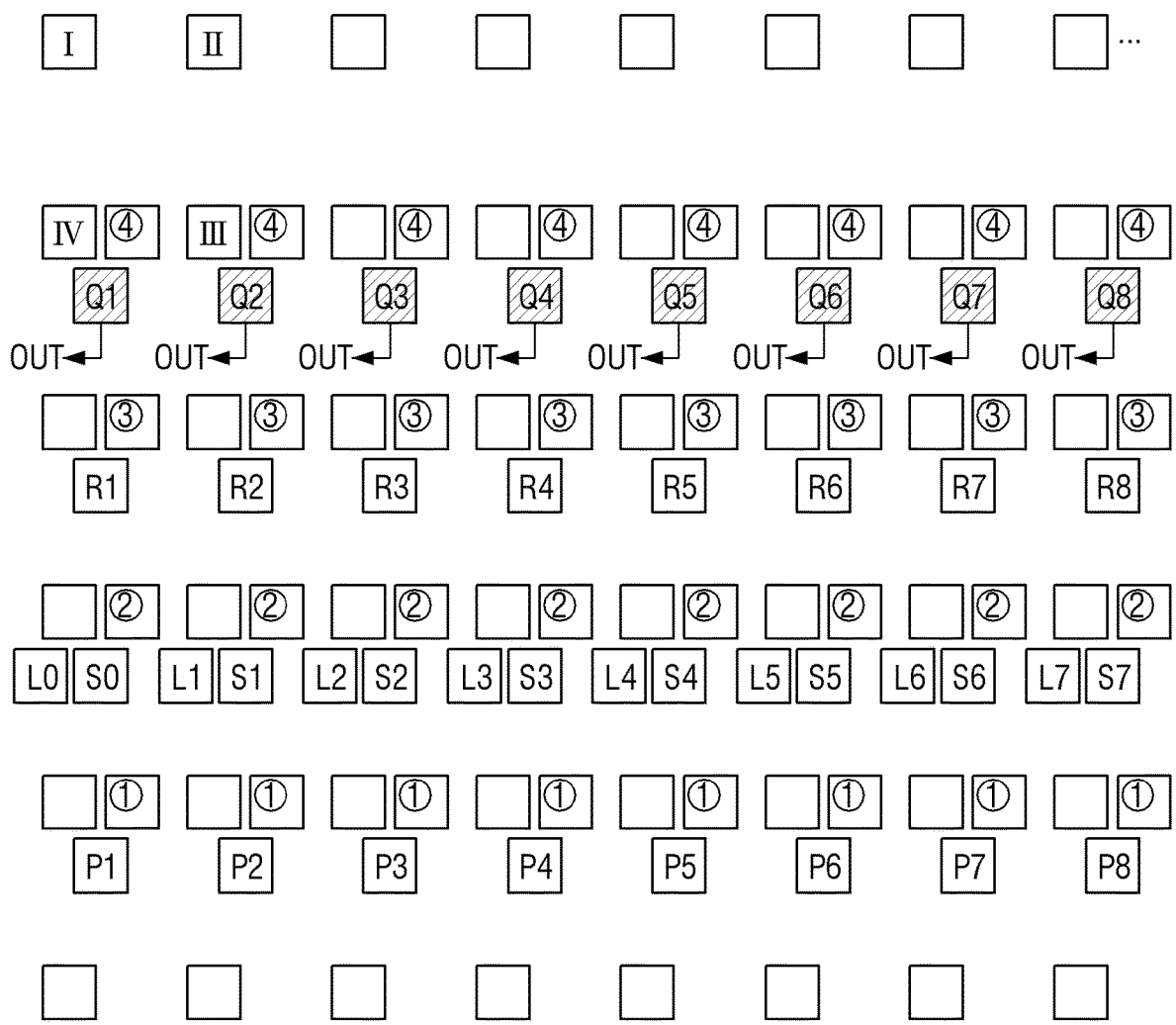

Referring to FIG. 7J, third accumulation values Q1 to Q8 are illustrated in which the second accumulation values K1 to K8 are summed to M1 to M8. The third accumulation values Q1 to Q8 are equal to the value obtained by summing values obtained by each multiplying the elements ① to ④ of the filter 70 with elements I to IV of the feature map, and the third accumulation values Q1 to Q8 are output through an output terminal to become elements of a first row and first column of a new feature map derived by the convolution operation described above.

FIGS. 8A, 8B, 8C, 8D, 8E, 8F, 8G 8H, 8I, 8J, 8K, 8L, 8M, and 8N are illustrations of a convolution method according to a CNN according to an embodiment of the present disclosure.

Figure 8A:
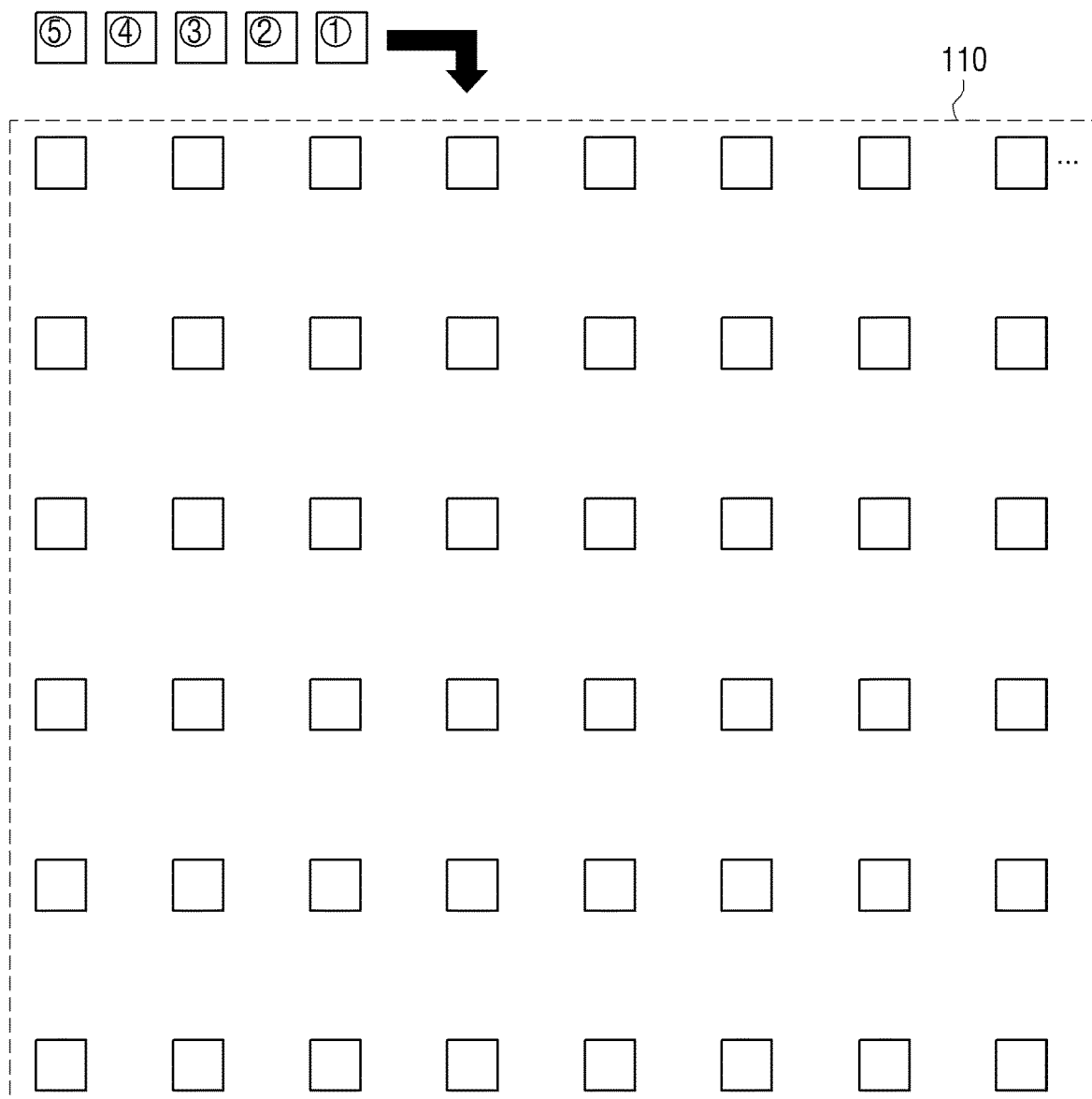

Referring to FIGS. 8A, in panels (a) and (b), when a filter 80 of 3×3 that includes a zero value is applied to the feature map, the processor 120 may remove the elements having the zero value from the filter 80, and may sequentially input five elements that do not have the zero value to the operation module 110 illustrated in FIG. 8A, panel (b).

Figure 8B:
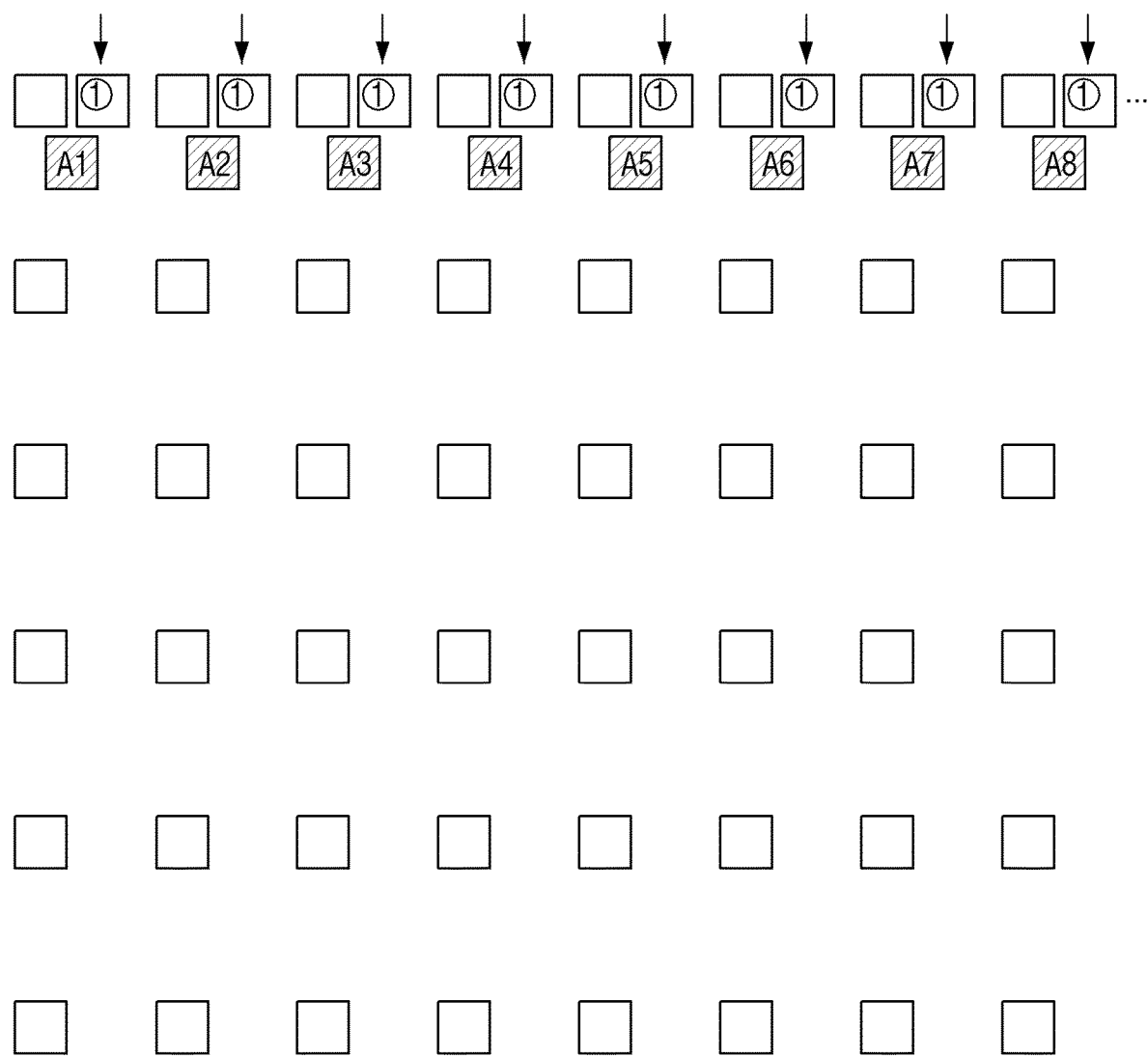

Referring to FIG. 8B, at first clock, an element ① is input to each PE included in a first row of the operation module 110. The respective elements of the filter 80 input to the operation module 110 sequentially proceed in one direction of the operation module 110, and the processor 120 performs an operation of multiplying an element ① of the elements configuring the filter 80 with each of the plurality of first data values belonging to the first row of the input feature map. That is, the respective PEs to which the element ① is input may derive result values A1 to A8 for a product of the element ① and the element of the feature map corresponding to each of the PEs.

Figure 8C:
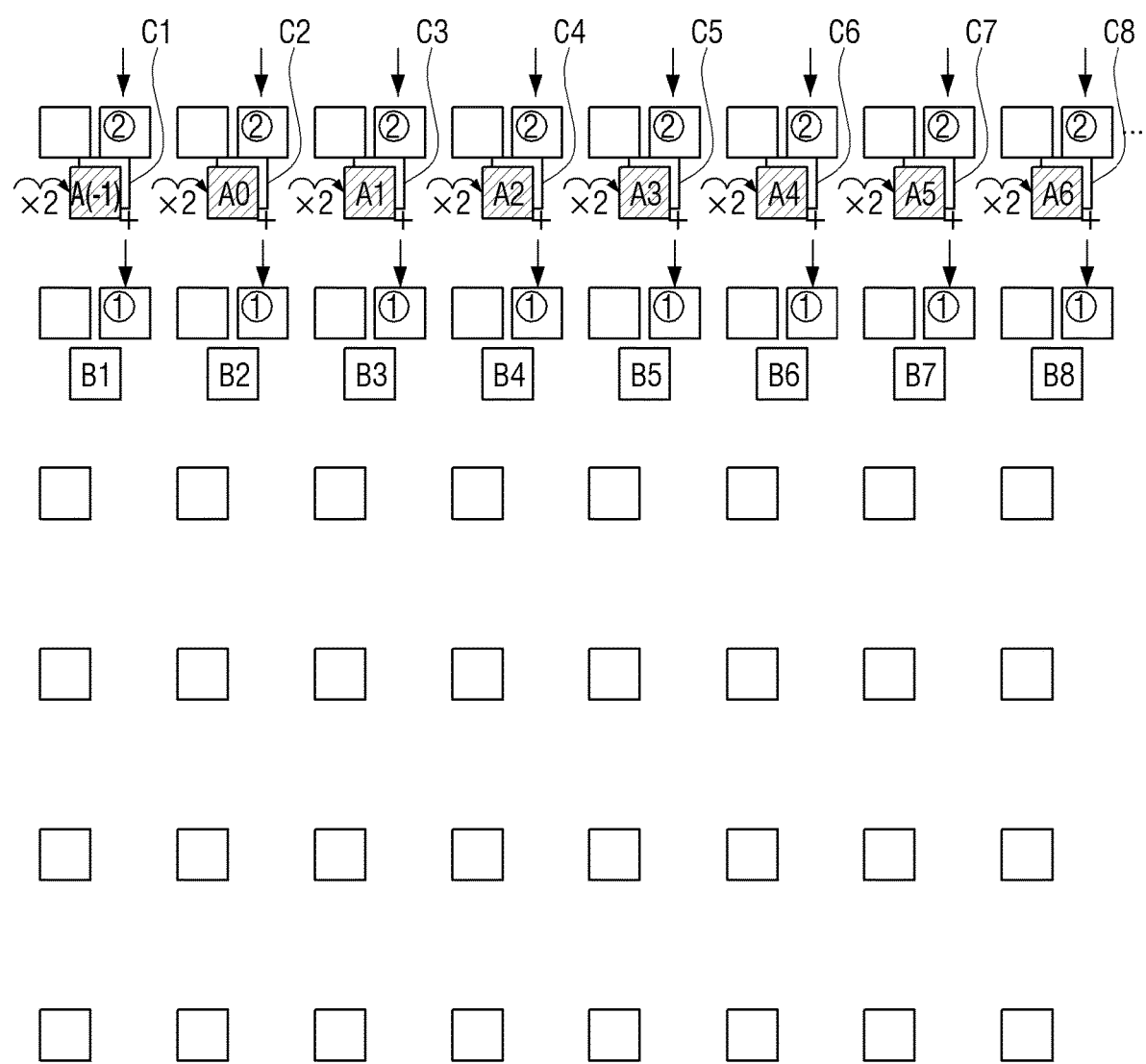

Referring to FIG. 8C, at the next clock, the element ② is input to each PE included in the first row of the operation module 110, and the element ① is input to each PE included in a second row. In this case, result values B1 to B8 obtained by multiplying the element ① and each of the elements of the feature map mapped to the PE of the second row may be each derived. Further, result values C1 to C8 obtained by multiplying the element ② and the elements of the feature map mapped to the PE of the first row may also be derived.

In this case, an accumulation operation in which A1 to A8 derived at the previous clock are moved to the right PE and are summed to C1 to C8 is performed. A direction in which the accumulation operation is performed is the same as a direction (a direction of an arrow in FIG. 8A, in panel (a)) corresponding to the numbered order in the filter 80. Unlike the embodiment of FIGS. 7A to 7J in which the filter does not include a zero value, since the filter 80 illustrated in FIG. 8A, panel (a), includes the zero value, A1 to A8 are also moved to the right by two spaces as the element ① and the element ② are spaced apart from each other in the filter 80 and the accumulation is performed. That is, C1 to C8 are each summed to A(−1) to A(6).

Figure 8D:
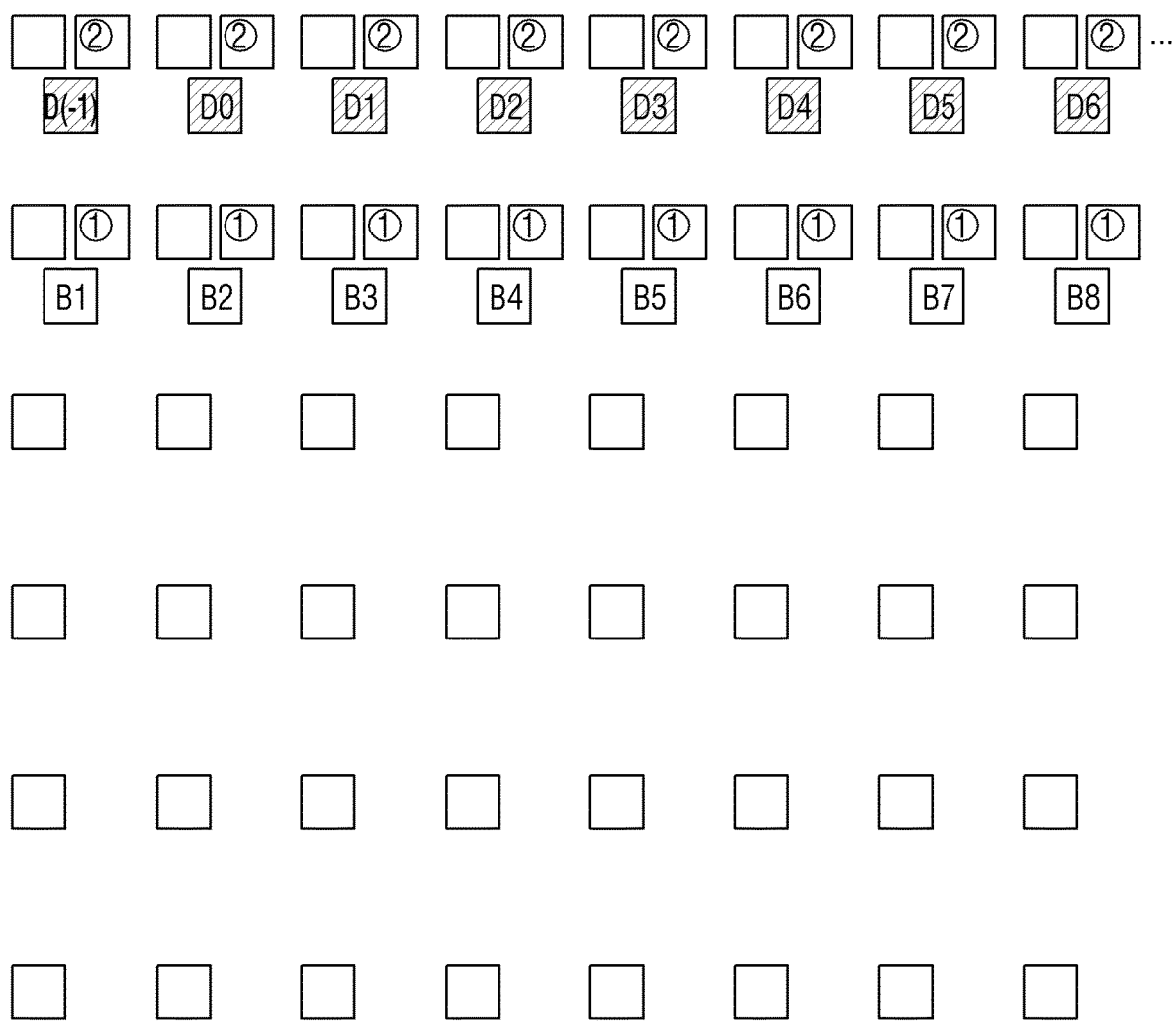

Referring to FIG. 8D, first accumulation values D(−1) to D6 are illustrated in which C1 to C8 are each summed to A(−1) to A(6).

Figure 8E:
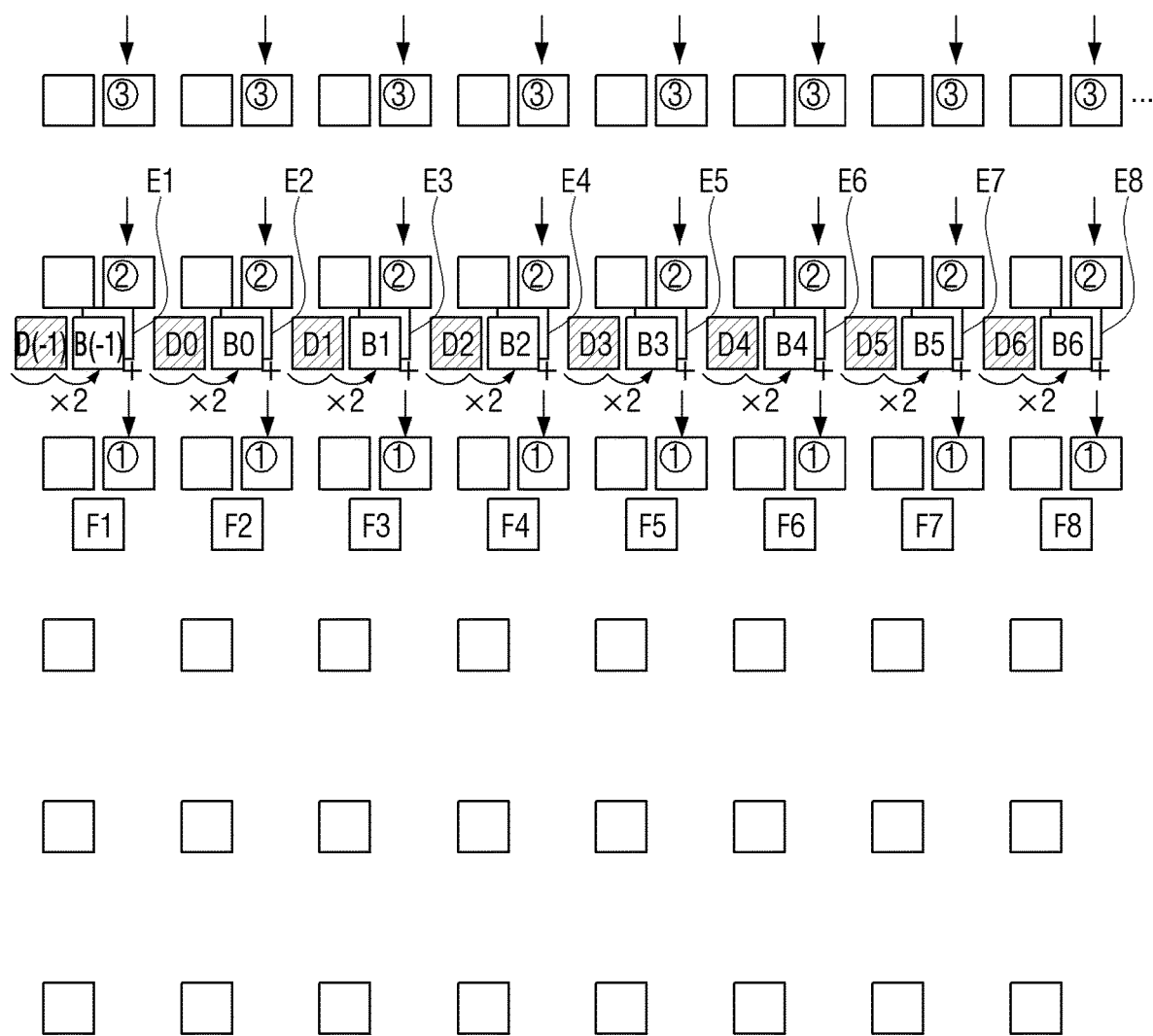

Referring to FIG. 8E, at a next clock, the element ③ is input to each PE included in the first row of the operation module 110, the element ① is input to each PE included in a third row, and the element ② is input to each PE included in a second row. In this case, result values E1 to E8 obtained by multiplying the element ② with the elements of the feature map mapped to the PE of the second row are derived, and the first accumulation values D(−1) to D6 derived at the previous clock may be moved to the PE adjacent to the lower end by one space and may be each temporarily stored in the memory included in the PE of the second row. At the same time, an accumulation operation in which B1 to B7 derived at the previous clock are moved to the right by two spaces similarly to A1 to A8 at the previous clock and are each summed to E1 to E8 is performed.

Referring to FIG. 8F, accumulation values G(−1) to G6 are illustrated in which E1 to E8 are each summed to B(−1) to B6.

Figure 8G:
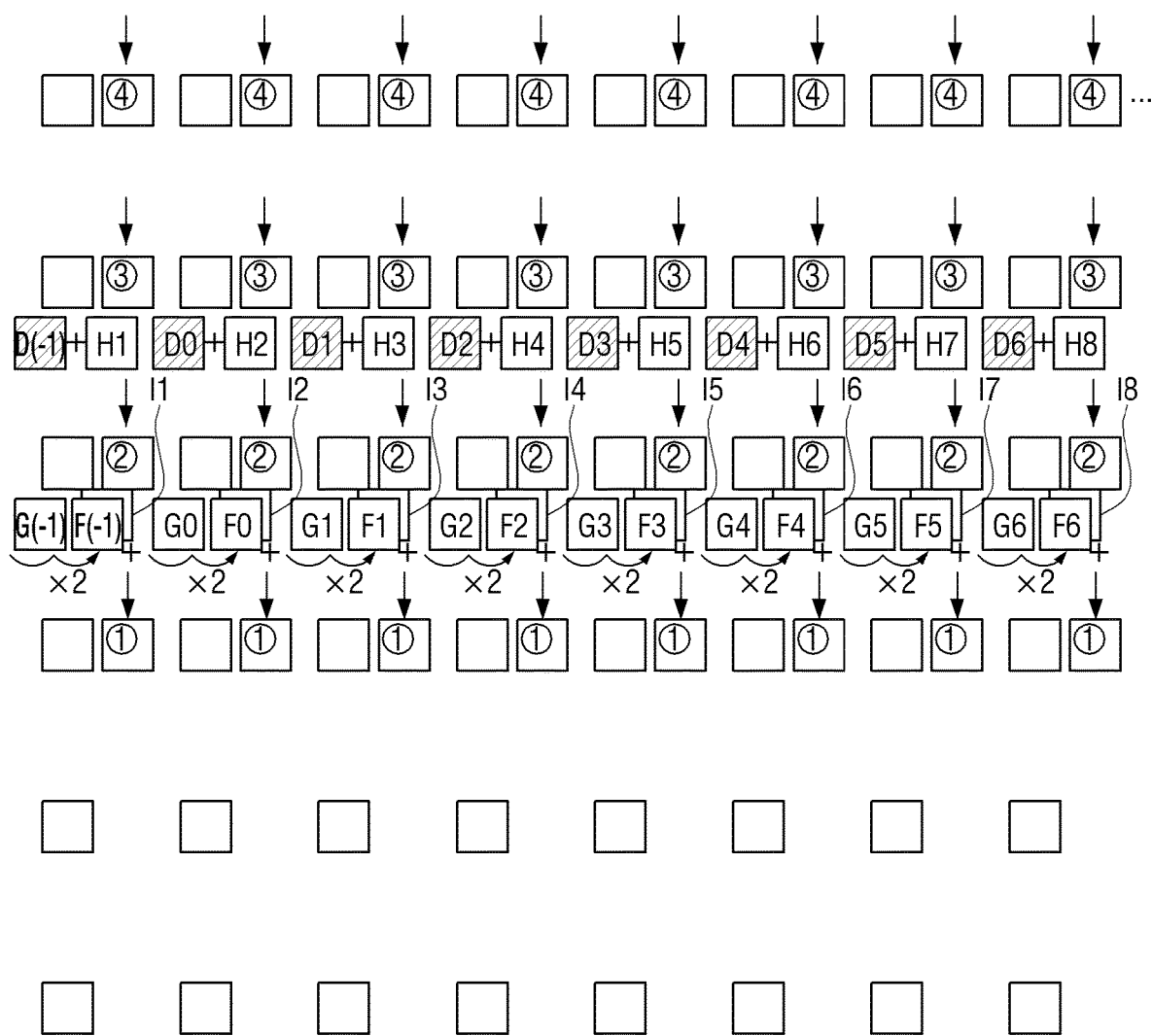

Referring to FIG. 8G, at the next clock, an element is input to each PE included in the first row of the operation module 110, the element ① is input to each PE included in a fourth row, the element ② is input to each PE included in the third row, and the element ③ is input to each PE included in the second row. In this case, result values H1 to H8 obtained by multiplying the element 3 with the elements of the feature map mapped to the PE of the second row are derived, and an accumulation operation in which H1 to H8 are each summed to D(−1) to D6 which are each temporarily stored in the PE of the second row is performed.

Referring to FIG. 8H, second accumulation values J(−1) to J6 are illustrated in which H1 to H8 are each summed to D(−1) to D(6).

Figure 8I:
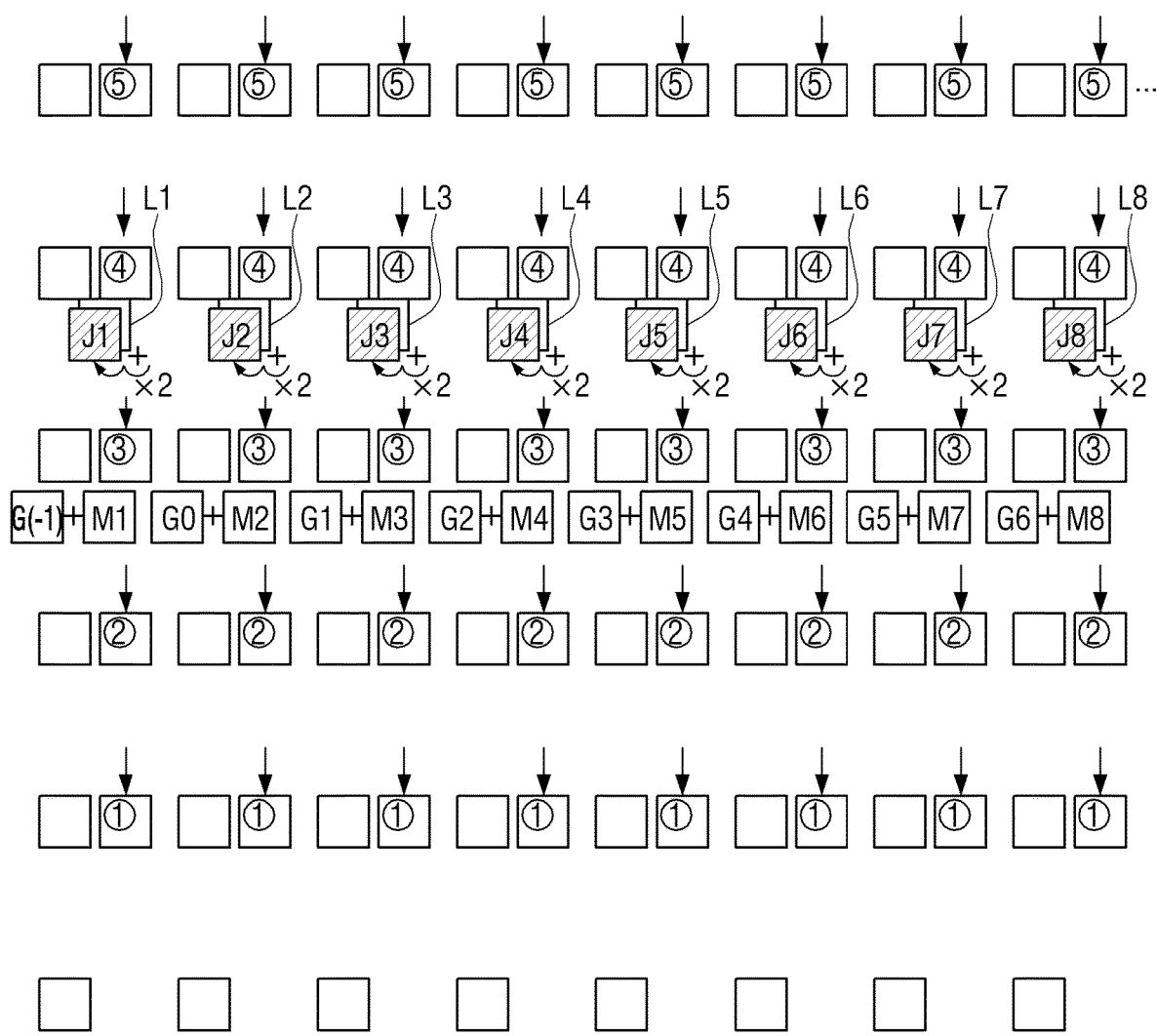

Referring to FIG. 8I, at the next clock, an element ⑤, which is the last element of the filter 70, is input to each PE included in the first row of the operation module 110, the element ① is input to each PE included in a fifth row, the element ② is input to each PE included in the fourth row, the element 3 is input to each PE included in the third row, and the element ④ is input to each PE included in the second row. In this case, result values L1 to L8 obtained by multiplying the element ④ and each of the elements of the feature map mapped to the PE of the second row may be derived. Further, the second accumulation values J(−1) to J6 derived at the previous clock are moved to the left PE by two spaces as illustrated in FIG. 8I, and an accumulation operation in which J(−1) to J6 are each summed to L1 to L8 may be performed.

Figure 8J:
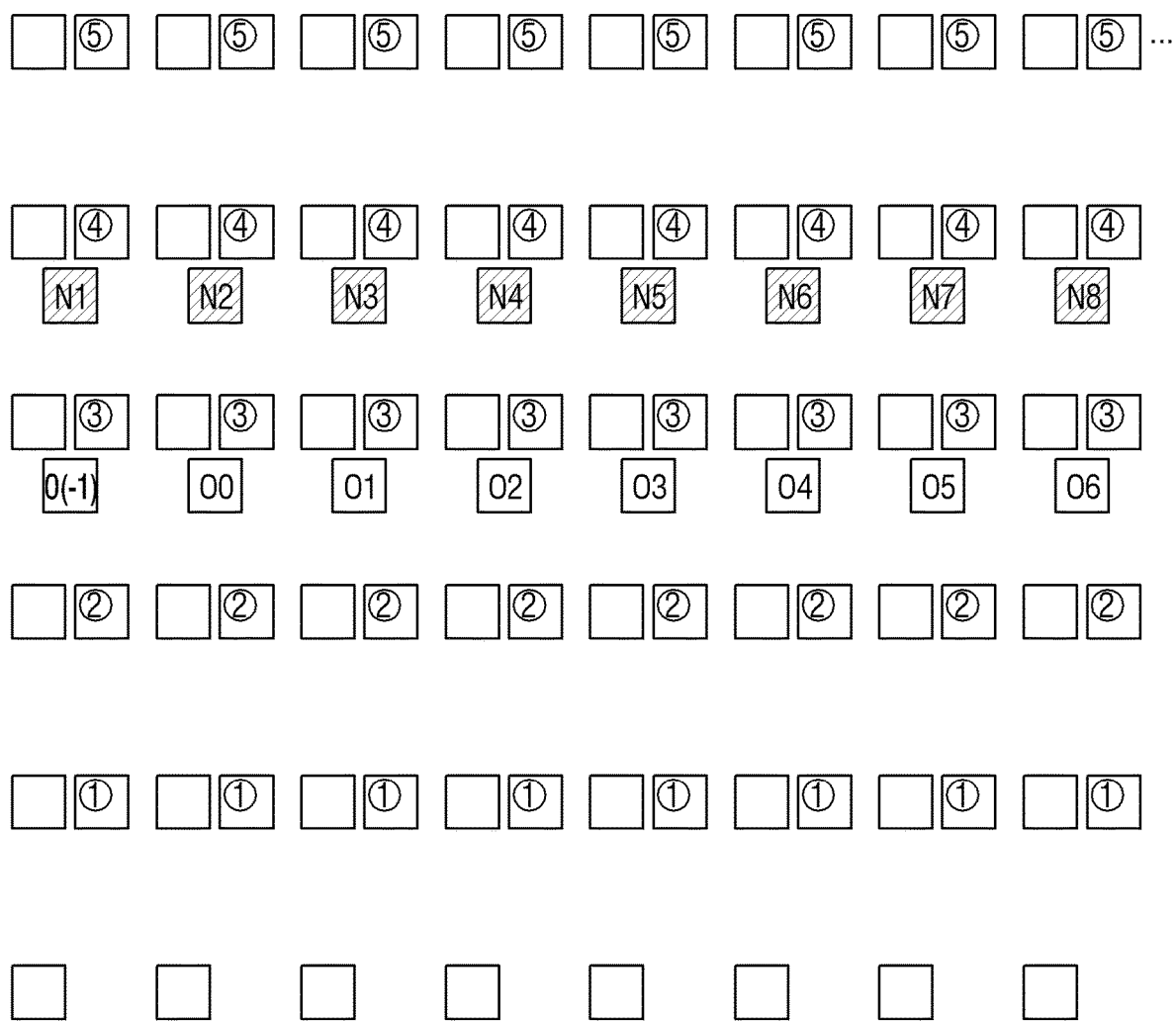

Referring to FIG. 8J, third accumulation values N1 to N8 are illustrated in which the second accumulation values J(−1) to J6 are each summed to L1 to L8.

Figure 8K:
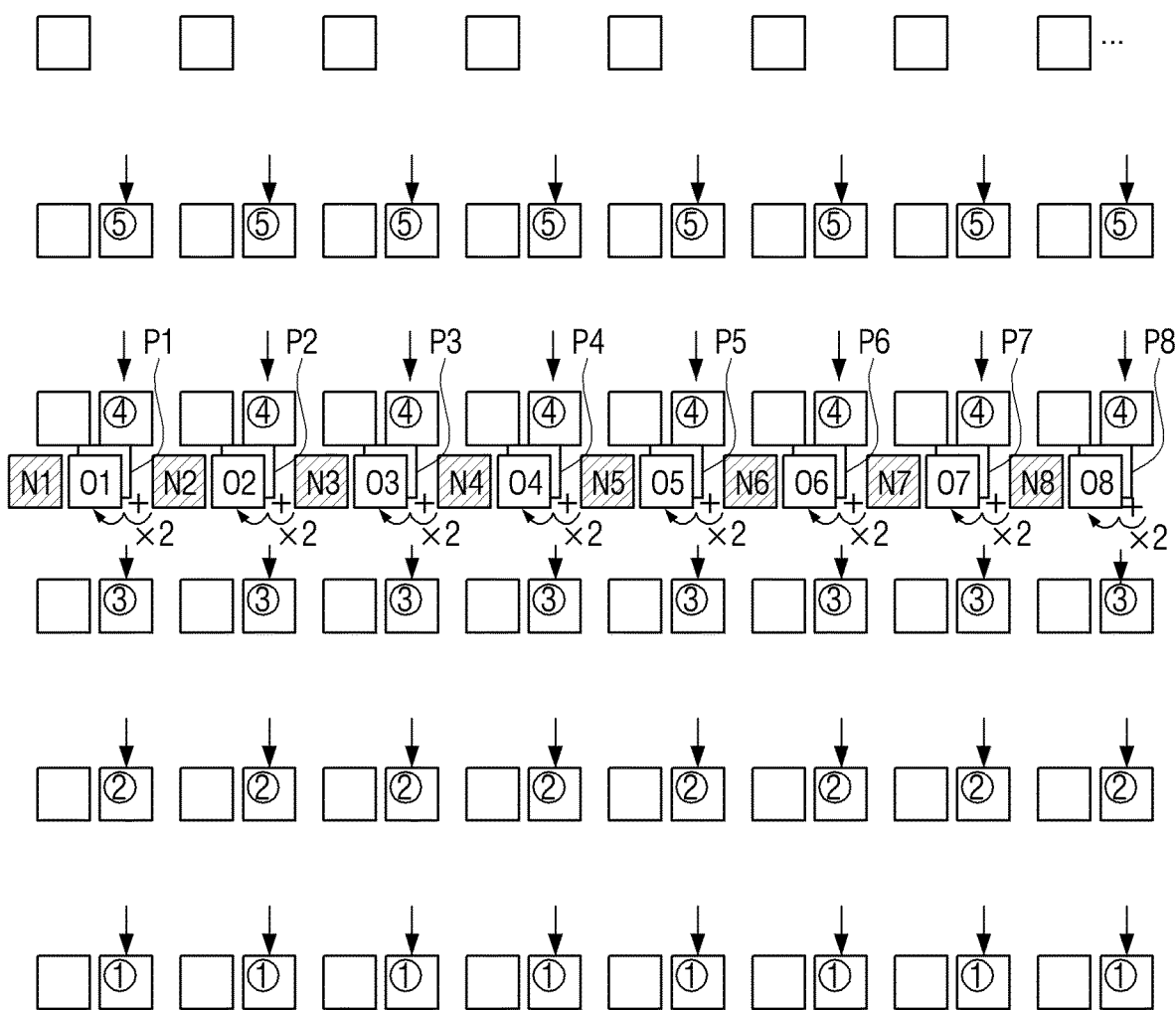
Figure 8L:
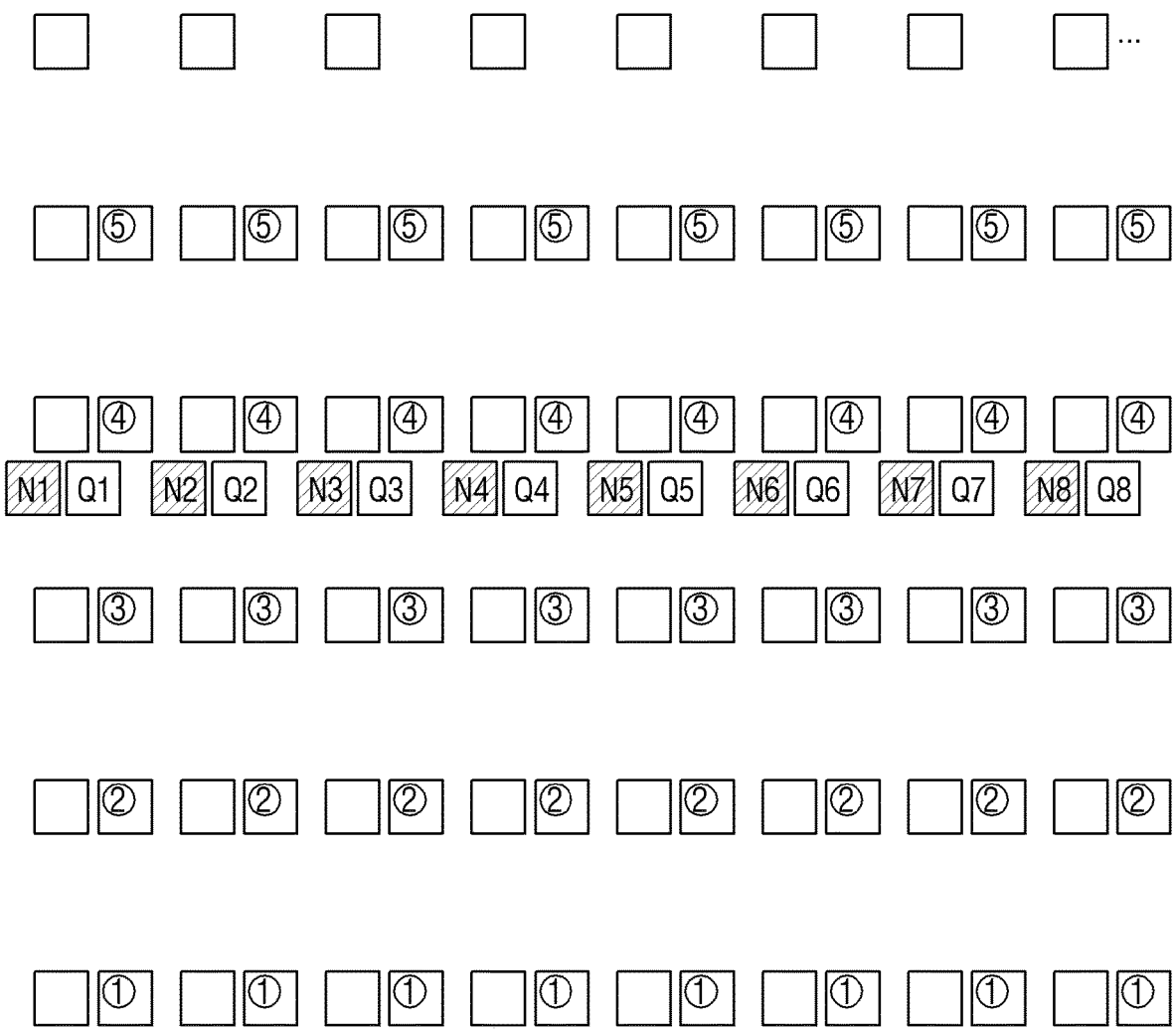

Referring to FIGS. 8K and 8L, at the next clock, the element ① is input to each PE included in a sixth row, the element ② is input to each PE included in the fifth row, the element ③ is input to each PE included in the fourth row, the element ④ is input to each PE included in the third row, and an element ⑤ is input to each PE included in the second row. In this case, the third accumulation values N1 to N8 derived at the previous clock are moved to the PE which is adjacent to the lower end by one space and may be each temporarily stored in the memory included in the PE of the third row.

Figure 8M:
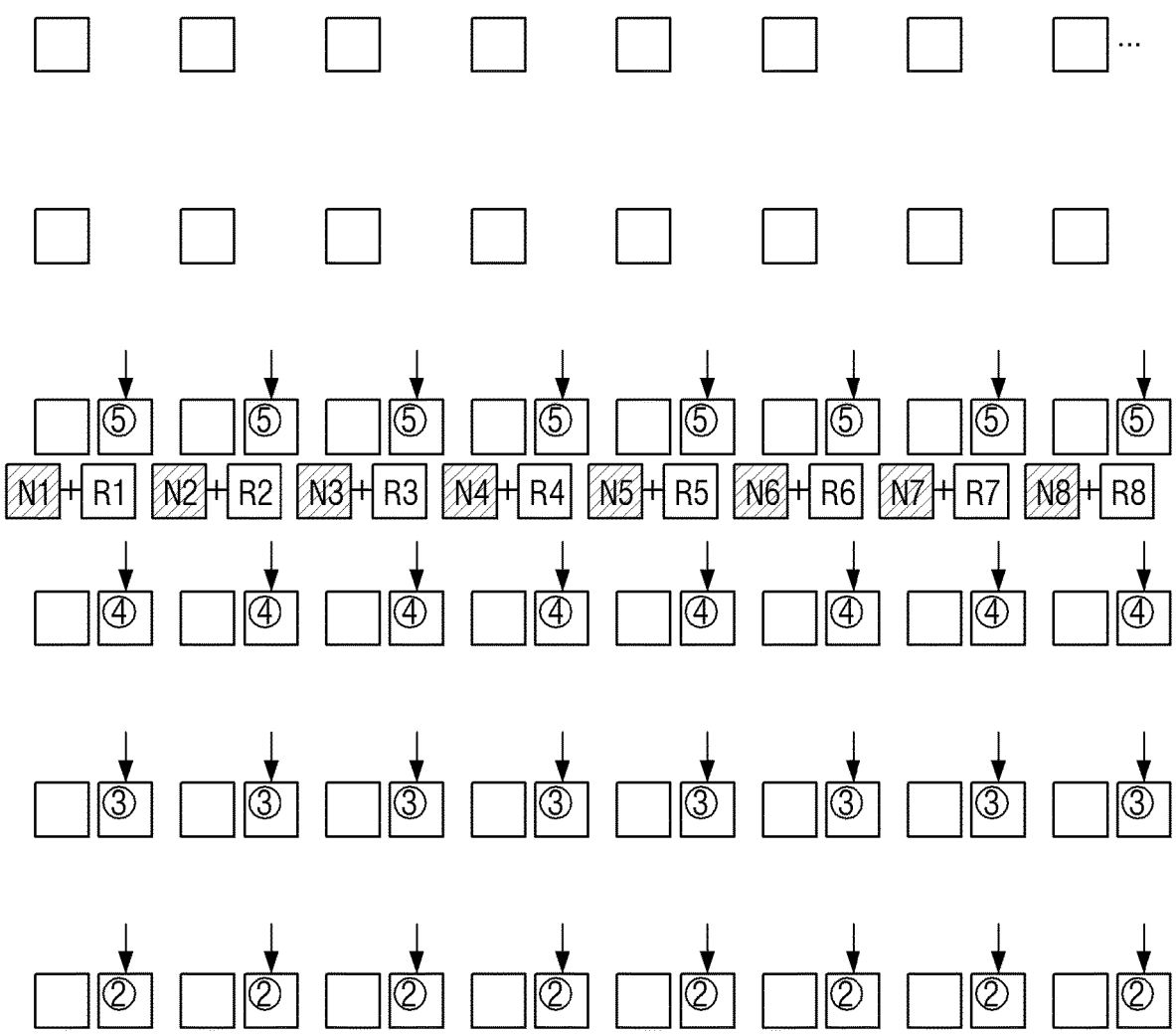
Figure 8N:
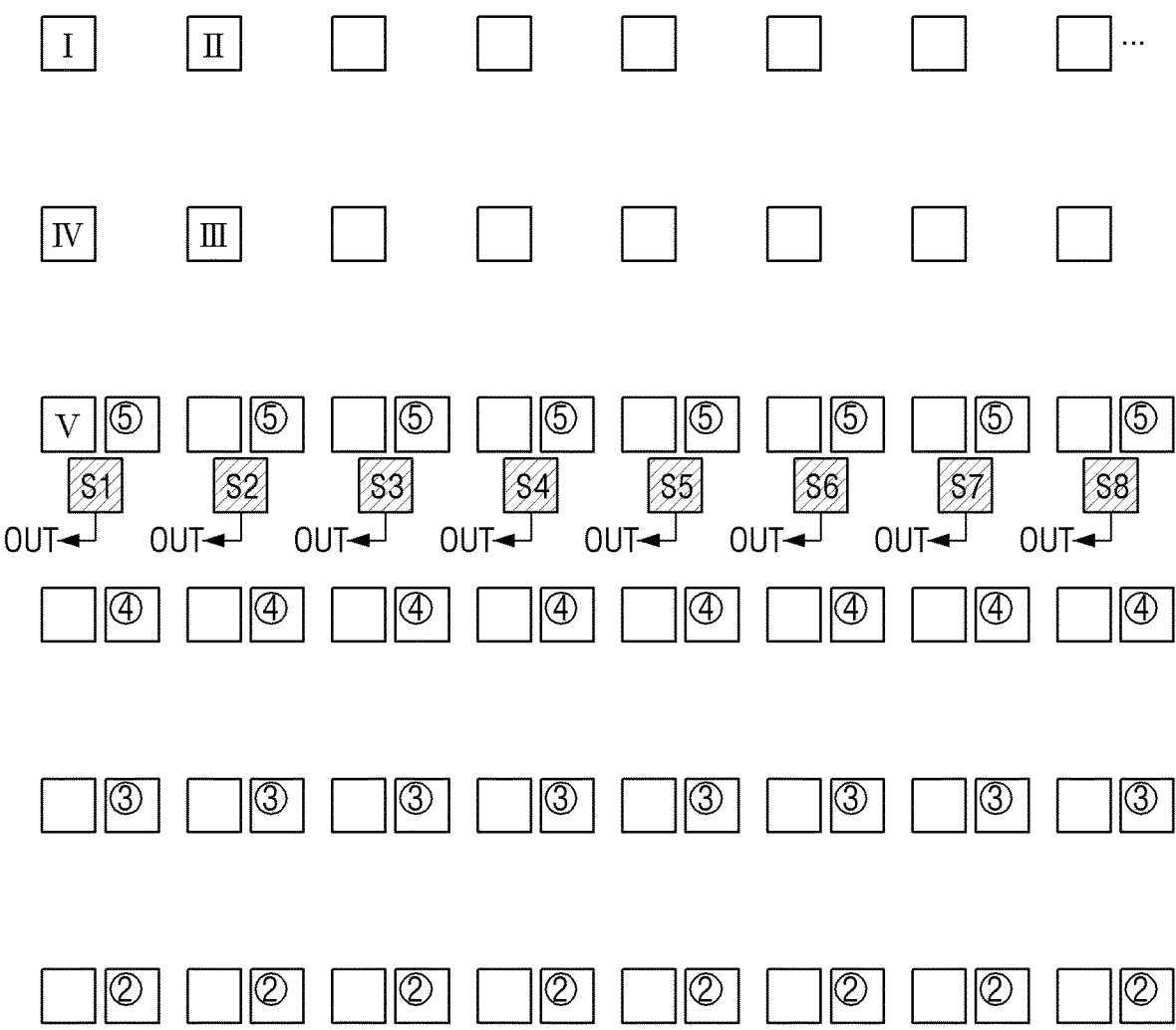

Referring to FIGS. 8M and 8N, at the next clock, the element ⑤ is input to the PE included in the third row, and result values R1 to R8 obtained by multiplying the element ⑤ with each of the elements of the feature map mapped to the PE of the third row may be derived. In this case, an accumulation operation in which the third accumulation values N1 to N8 which are temporarily stored in the PE of the third row are each summed to R1 to R8 is performed, and fourth accumulation values S1 to S8 may be derived, as illustrated in FIG. 8M. The fourth accumulation values S1 to S8 are equal to a value obtained by summing values obtained by each multiplying the elements ① to ⑤ of the filter 80 with elements I to V of the feature map, and the fourth accumulation values S1 to S8 are output through an output terminal to become elements of a first row and first column of a new feature map derived by the convolution operation described above.

As described above, when the filter which is divided in one dimension is sequentially applied to the feature map, since an operation for the zero value may be omitted in the filter, a load of the memory is reduced and operation efficiency is increased.

Figure 9:
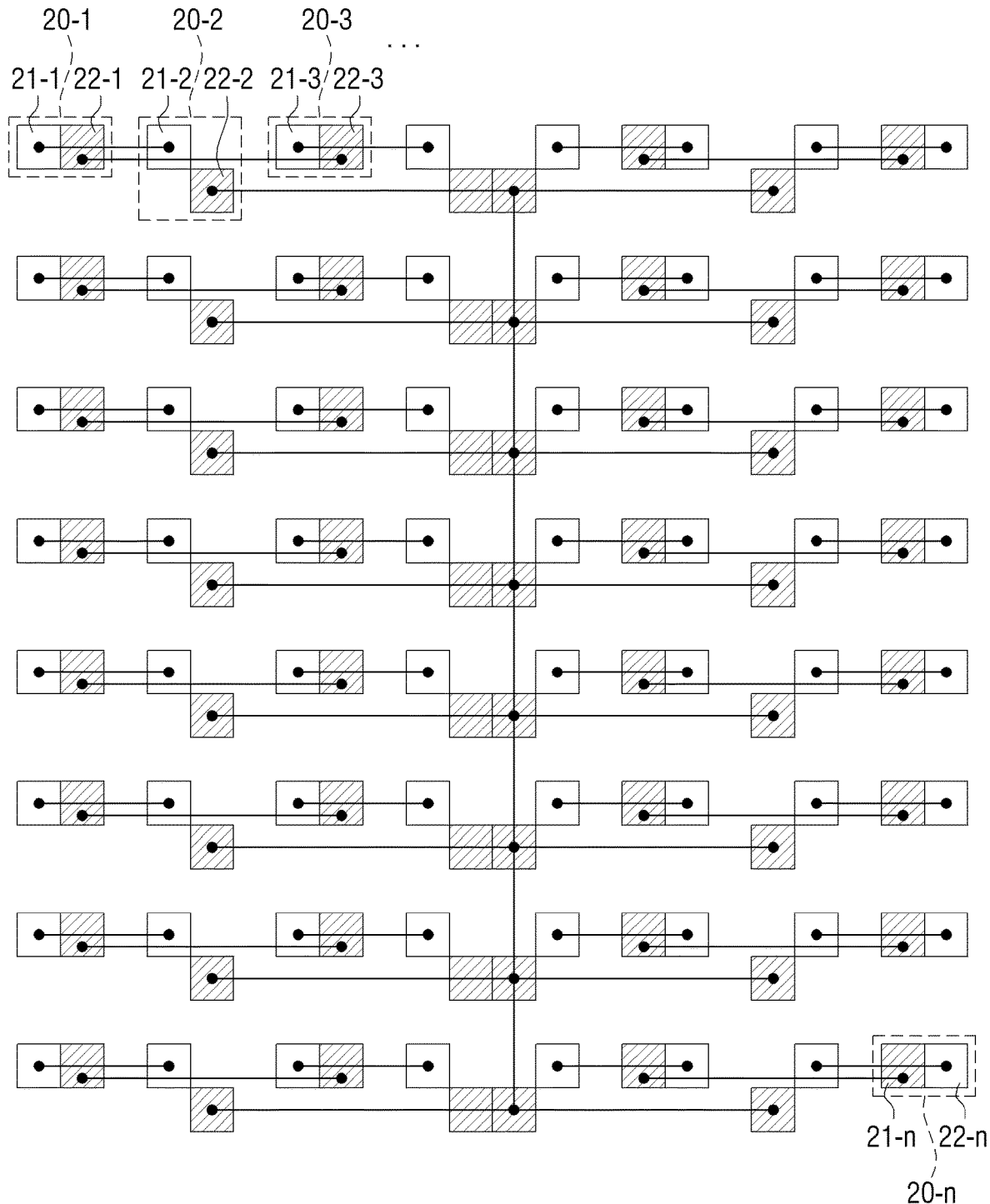
FIG. 9 is an illustration of a network structure of a PE for performing an operation, according to an RNN.

FIG. 9 is an illustration of a network structure of a PE for performing an operation according to a RNN.

Referring to FIG. 9, an operation module 110 forming a systolic array of a tree topology network structure is illustrated. A plurality of PEs 20-1 to 20-n may share data with PEs which are not adjacent to each other to perform the operation, using such a tree topology network structure. Such a tree topology network structure is generally used when an operation according the RNN is performed.

As such, since the operations according to the CNN and the RNN have different paths through which data is transmitted, there is an issue in that both operations according to the CNN and the RNN may not be supported by only an array structure of a single PE of the mesh topology network structure or the tree topology network structure. In particular, since the operation module 110 forming the systolic array of the tree topology network structure is also required for the fully connected layer of CNN, both the operation module 110 of the mesh topology network structure and the operation module 110 of the tree topology network structure were required.

A structure of the operation module 110 according to an embodiment of the present disclosure may form an integrated network in which the mesh topology network structure and the tree topology network structure are coupled to each other to perform the operations according to both the CNN and the RNN.

Figure 10:
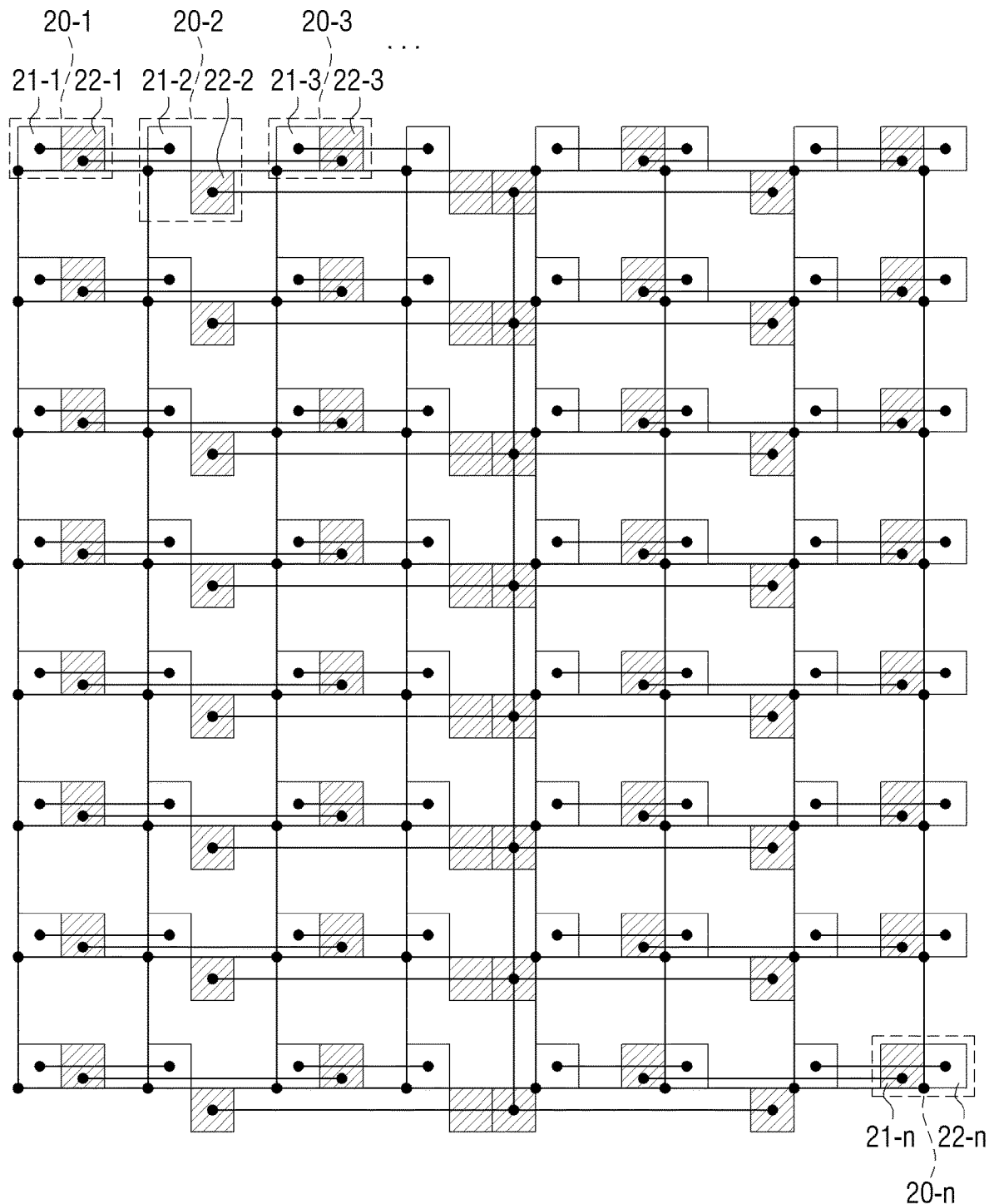
FIG. 10 is an illustration of an integrated network structure of a PE capable of supporting both operations according to a CNN and an RNN, according to an embodiment of the present disclosure.

FIG. 10 is an illustration of a network structure of the operation module 110 according to an embodiment of the present disclosure.

Referring to FIG. 10, the processor 120 may control the operation module 110 to perform operations according to a CNN algorithm and an RNN algorithm, using the network of the coupled structure as described above. For example, the processor 120 may control the operation module 110 to perform an operation according to the mesh topology network in a convolution layer and a pooling layer of the CNN algorithm and perform an operation according to the tree topology network in the fully connected layer of the CNN algorithm and in each layer of the RNN algorithm.

Accordingly, since each PE may transmit data such as the accumulation value, or the like between up down left and right PEs which are adjacent to each other as well as PEs which are not adjacent to each other, there are advantages in terms of data recycling and efficiency of operation. Further, since all of the operation by the CNN, the classification by the full connection, and the operation by the RNN may be performed in one operation module 110, the number of PEs necessary for machine learning is reduced, thereby making it possible to reduce cost.

FIG. 11 is an illustration of a method of performing an operation by a full connection and a convolution operation of a 1×1 kernel using an integrated network structure of a PE, according to an embodiment of the present disclosure.

Referring to FIG. 11, in panel (a), a classification process by the fully connected layer of a CNN algorithm is illustrated. The fully connected layer derives a final result value by classifying feature data which is compressed and summarized by the convolution layer and the pooling layer of the CNN by a deep neural network. The feature data calculated by repeating the convolution layer and the pooling layer is input to the deep neural network of the fully connected layer as input values $i_1$ to $i_{1000}$, and each of the input values is connected to an edge having weight $W_{ij}$. A value obtained by summing values obtained by multiplying each input value with the weight is input to an activation function (e.g., a signoid function) to output activation values $j_1$ to $j_{800}$, where the activation values perform the same function as another weight in the next layer to output the final output value.

As illustrated in FIG. 11, panel (a), the processor 120 may control the operation module 110 to perform the classification operation by the fully connected layer using the operation module 110 of the integrated network structure illustrated in FIG. 10. For example, the respective input values $i_1$ to $i_{1000}$ are arranged in series on an upper end portion of the operation module 110 and input, and are sequentially moved to a lower end portion by one space by the mesh topology network. In this case, each weight is previously stored in each PE of the operation module 110, and an operation in which the input value and the weight are each multiplied is performed in each PE. The multiplied values in each PE are accumulated by the tree topology network to output the activation values $j_1$ to $j_{800}$.

Further, the operation module 110 of the integrated network structure of FIG. 10 may be used even in a case in which a convolution by a filter of a size of 1×1 including only one element is performed. In this case, according to the present disclosure, as illustrated in FIG. 11, in panel (b), a method for performing a convolution by first applying a filter of 1×1 in a depth direction 1 of a three-dimensional (3D) feature map is used, thereby making it possible to increase operational speed for outputting the result value. In this case, when a 1:1 convolution for a plurality of filters of 1×1 in the depth direction 1 is performed, the operation module 110 of the integrated network structure of FIG. 10 may be used. In this case, the input values as much as a depth of the 3D feature map are arranged in series on the upper end portion of the operation module 110 and are input, and are sequentially moved by one space to the lower end portion by the mesh topology network, and the activation value accumulated by the tree topology network is output.

Figure 12:
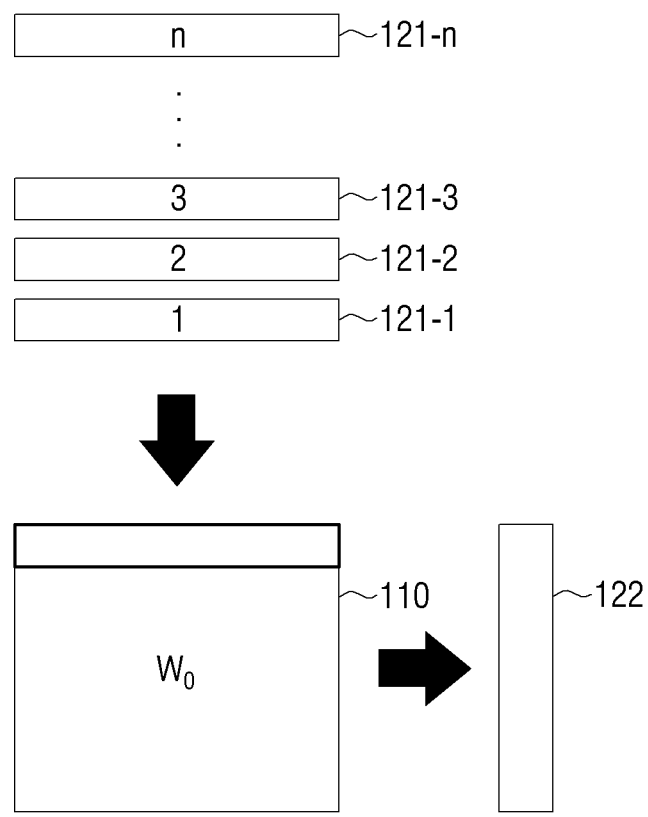
FIG. 12 is illustration of a method of performing an operation by an RNN using an integrated network structure of a PE, according to an embodiment of the present disclosure.

FIG. 12 is an illustration of a method for performing an operation by an RNN using an integrated network structure of a PE, according to an embodiment of the present disclosure.

Referring to FIG. 12, the RNN is an algorithm for performing deep learning for time-series data changed over time, and is used to process tasks such as, for example, voice recognition, music genre classification, string generation, video classification, and the like. Since the RNN has a form in which the neural network of every instant are stacked, input values 121-1 to 121-$n$ of a current (t) neural network to input values of a past (t−1) neural network may be sequentially input to the operation module 110 of FIG. 10. A weight W0 of the neural network may be stored in each PE of the operation module 110 in advance. The operation module 110 may output a value 122 in which the operation values are accumulated for each of the layers of the RNN, a past value operated in each layer may be temporarily stored in each PE and may be transferred to a current operation process, thereby affecting the current operation process. In other words, the past value is temporarily stored in each PE and is reflected to the operation in the current layer to be the same as a recurrent weight being applied in RNN.

FIGS. 13A, 13B, 13C, 13D, 13E, 13F, and 13G are illustrations of a method of performing an operation by a full connection using an integrated network structure of a PE, according to an embodiment of the present disclosure.

Figure 13A:
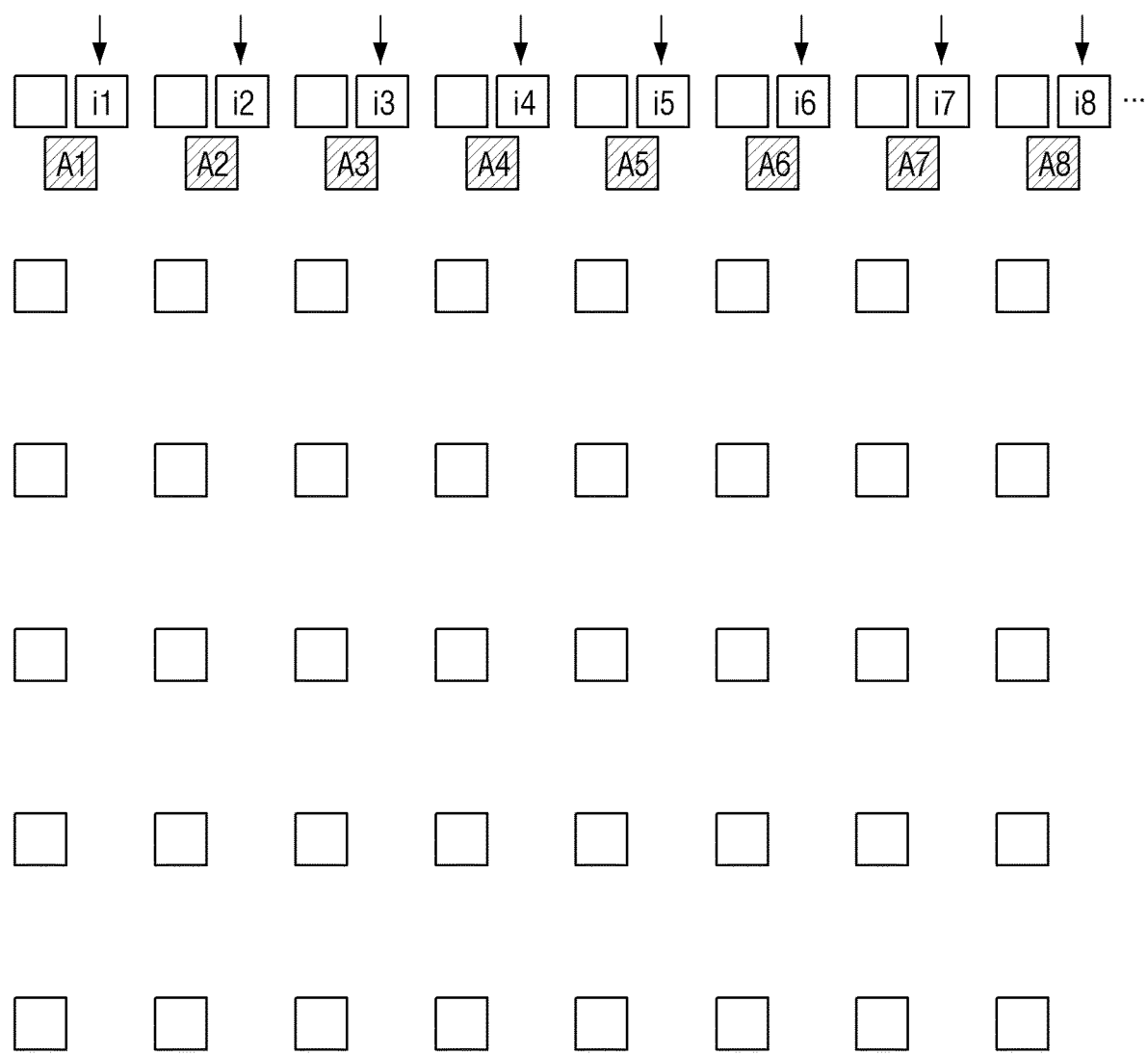
FIGS. 13A, 13B, 13C, 13D, 13E, 13F, and 13G are illustrations of a method of performing an operation by a full connection using an integrated network structure of a PE, according to an embodiment of the present disclosure.

Referring to FIG. 13A, when the first input values $i_1$ to $i_8$ at time t−1 are input to the operation module 110, the processor 120 may derive products A1 to A8 of the first input values and the weight stored in the PE included in the first row of the operation module 110. Then, when the second input values are input to the operation module 110 at the next clock t, A1 to A8 are temporarily stored in the PE and are utilized as recurrent weights.

Figure 13B:
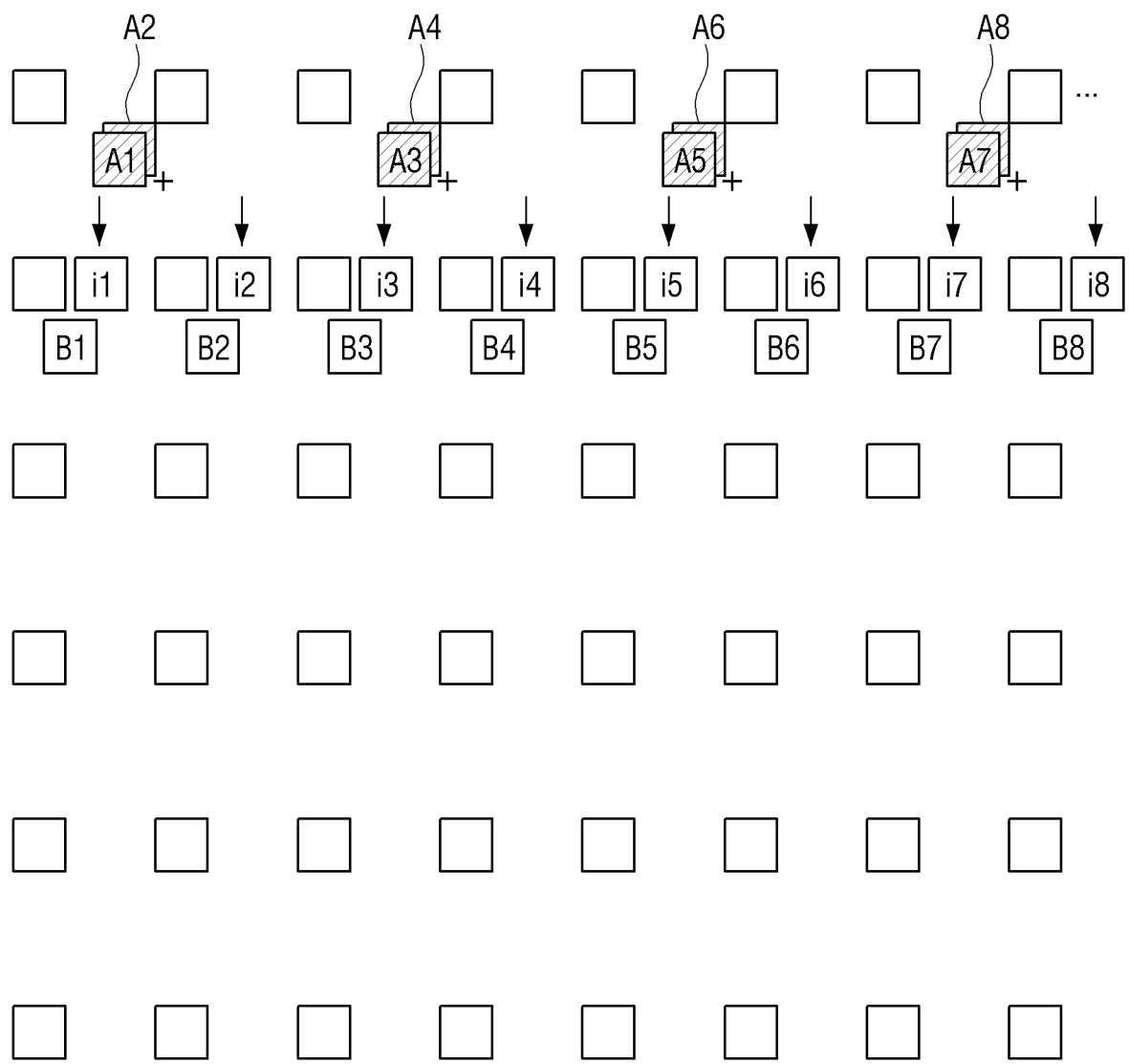

Referring to FIG. 13B, at the next clock, the first input values are input to the PE included in the second row of the operation module 110 using the mesh topology network connection, such that products B1 to B8 of the first input values and the weight stored in the PE included in the second row are derived. Further, a first accumulation is performed for A1 to A8 in the first row using the tree topology network connection. That is, A1 and A2 are summed, A3 and A4 are summed, A5 and A6 are summed, and A7 and A8 are summed.

Figure 13C:
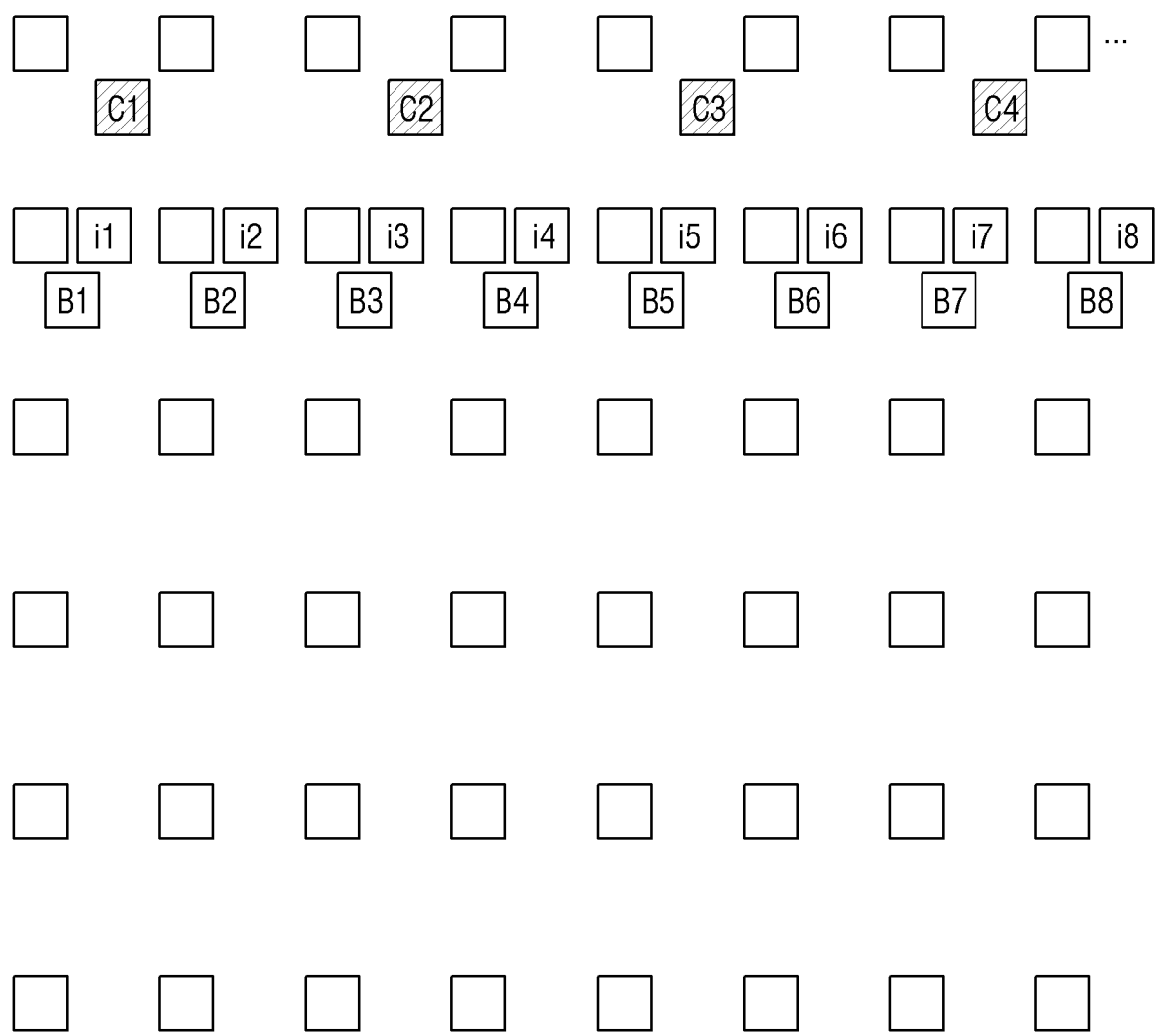

Referring to FIG. 13C, values C1 to C4 are illustrated, which resulted from summing A1 to A8 with an adjacent value by the tree topology network in the first row. In addition, an operation using the second input values which are input at the time t is performed in FIG. 13C.

Figure 13D:
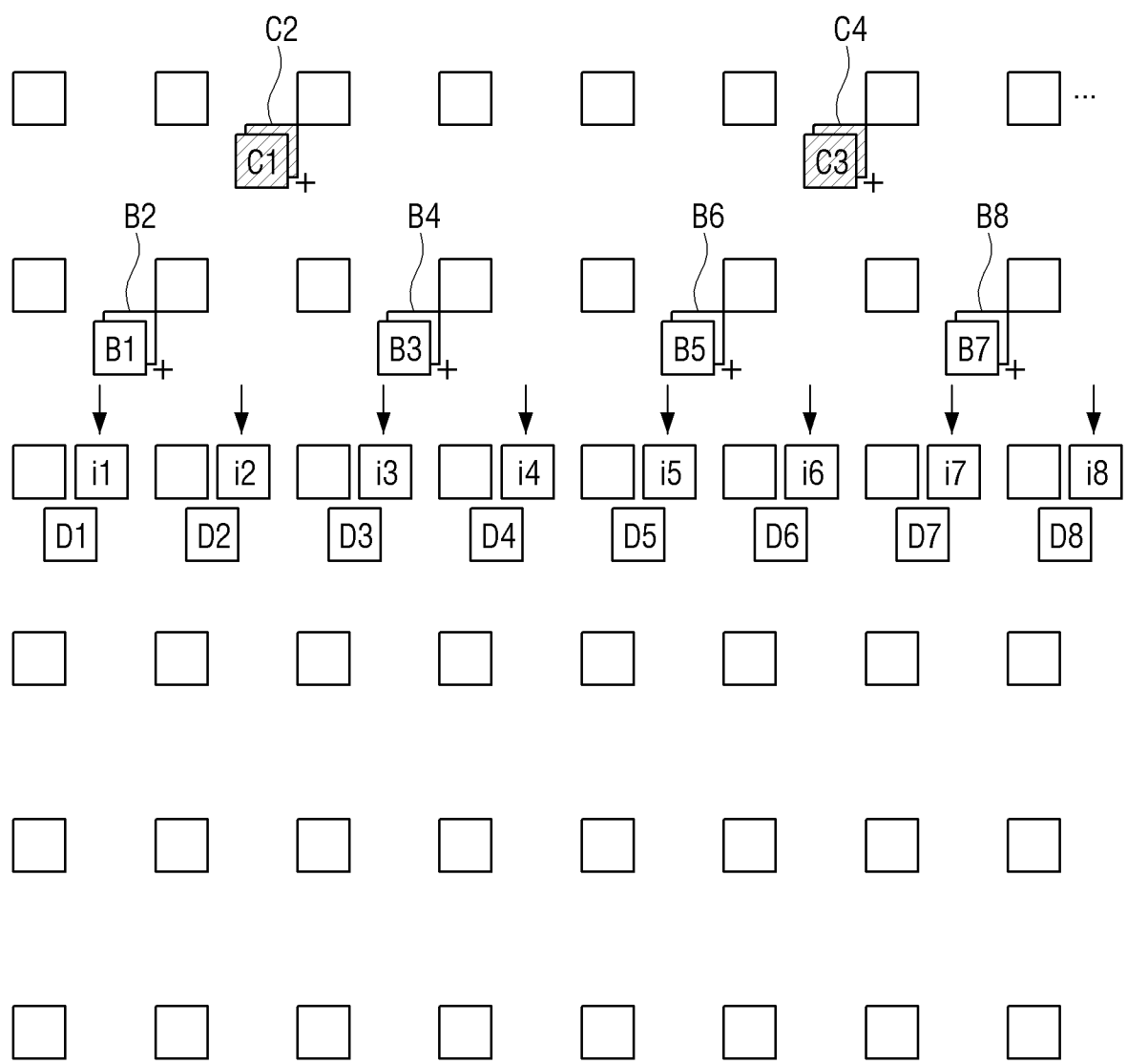

Referring to FIG. 13D, at the next clock t+1, the first input values are moved to the PE included in the third row of the operation module 110 to derive products D1 to D8 of the first input values and the weight stored in the PE included in the third row, and a second accumulation is performed for C1 to C4 in the first row using the tree topology network connection. That is, C1 and C2 are summed and C3 and C4 are summed.

Figure 13E:
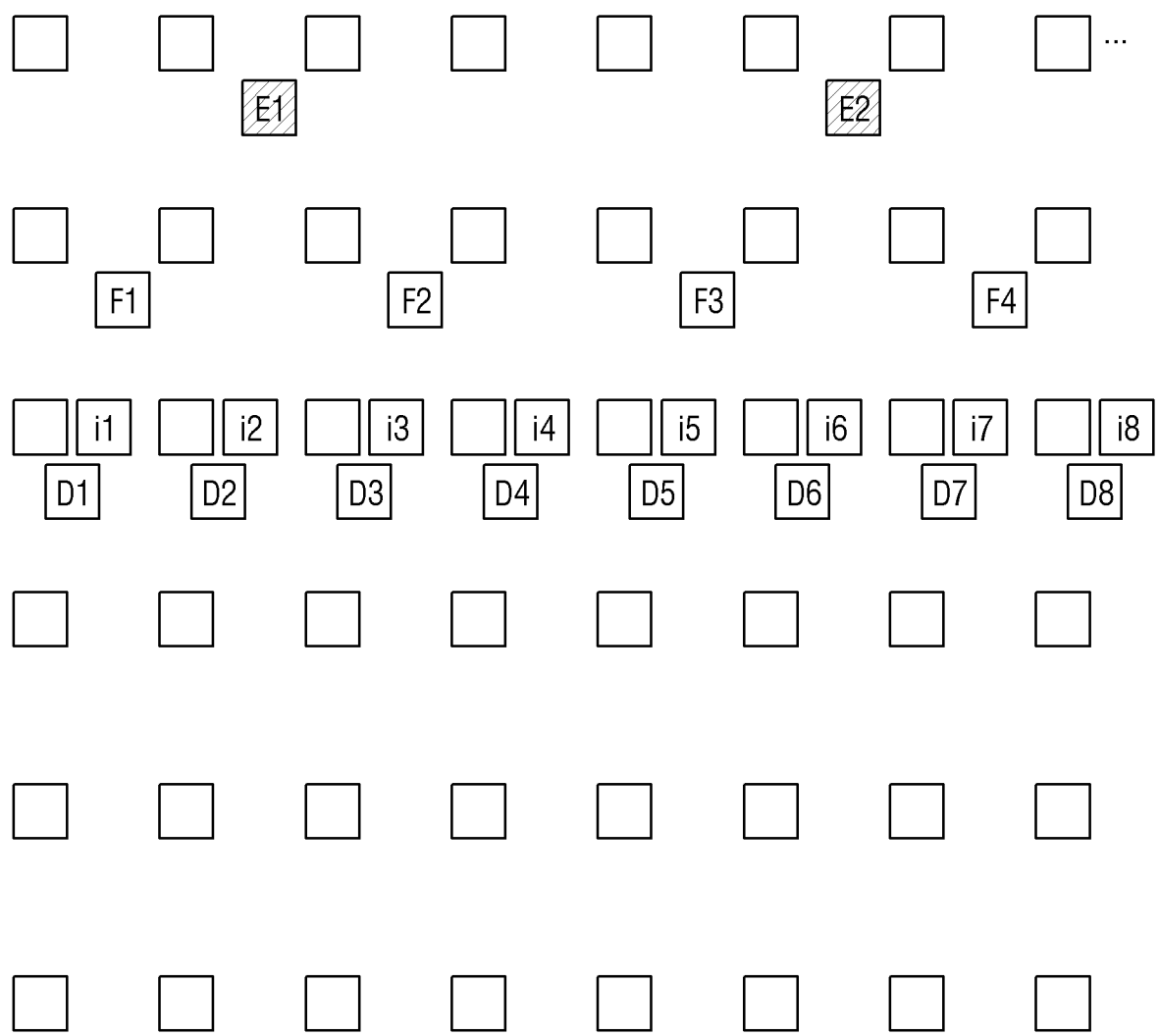

Referring to FIG. 13E, values E1 and E2 are summed in the first row. In addition, an operation using the third input values which are input at time t+1 is performed in FIG. 13E.

Figure 13F:
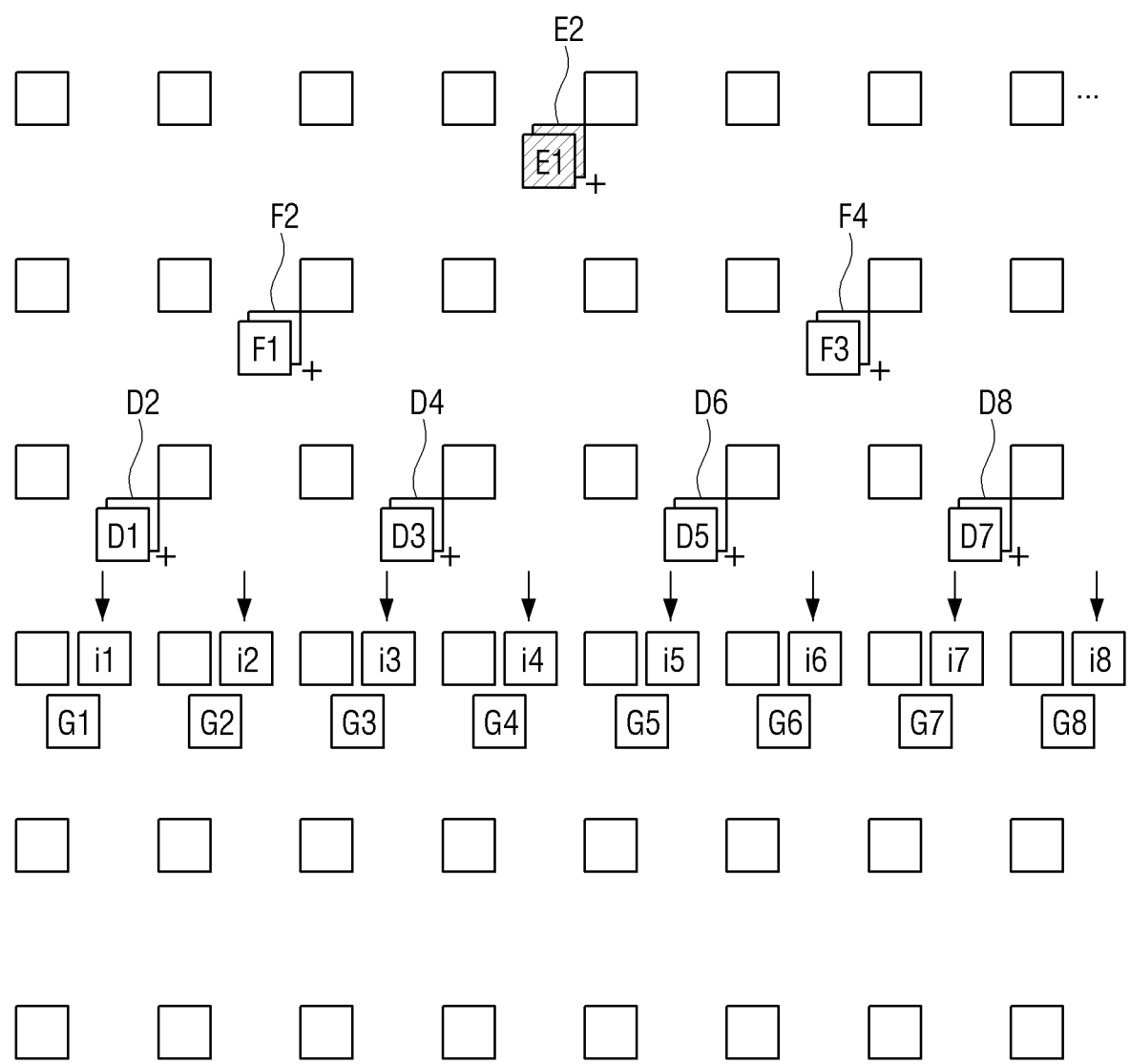
Figure 13G:
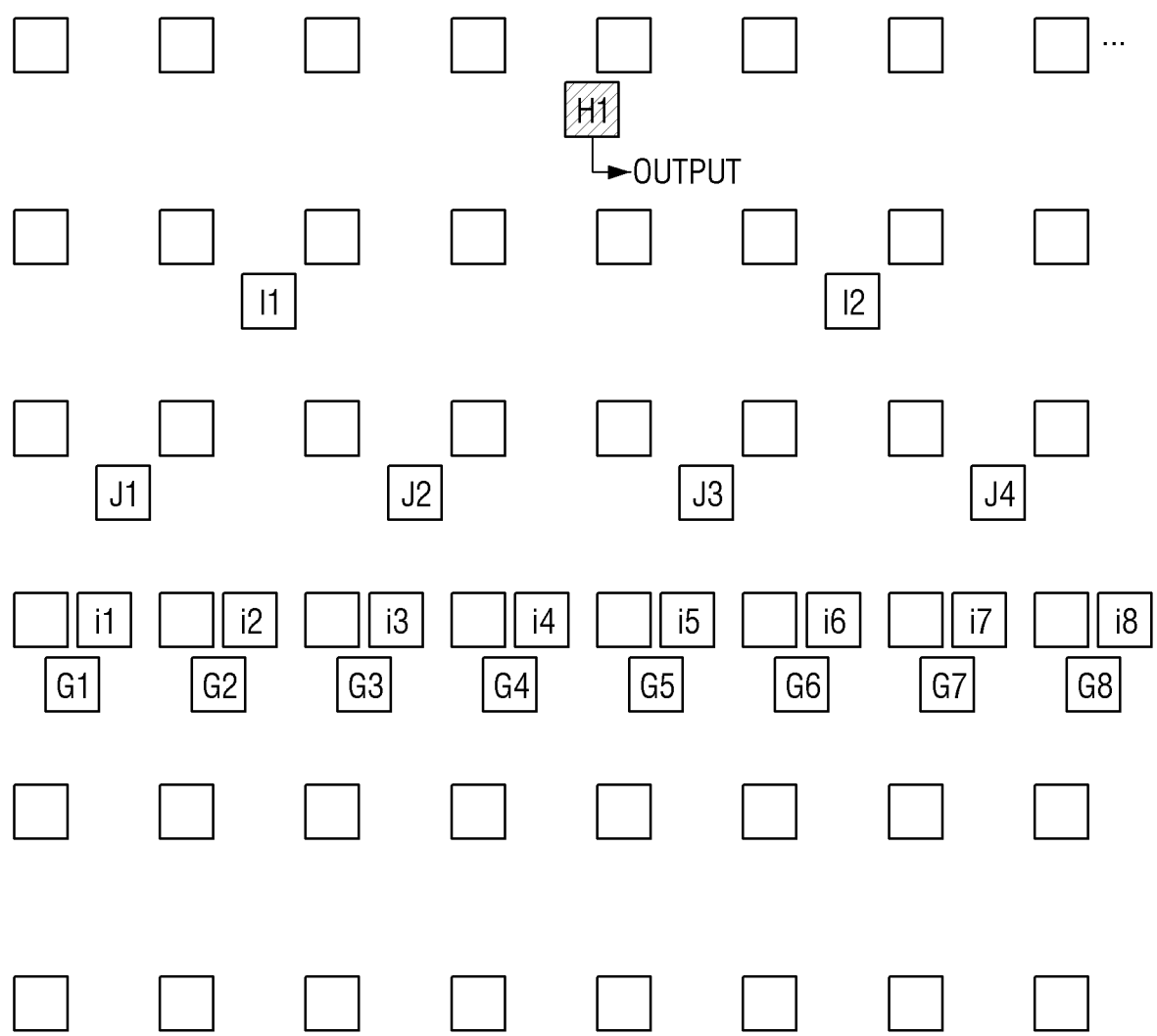

Referring to FIG. 13F, at the next clock t+2, the first input values are moved to the PE included in the fourth row of the operation module 110, such that an operation is performed in the same way as that described above Referring to FIG. 13GF, a third accumulation is performed for E1 and E2 derived by the second accumulation in the first row using the tree topology network connection, and H1, which results from summing E1 and E2, is output. A value which is output from each row in this way becomes an input value of the next layer.

Figure 14A:
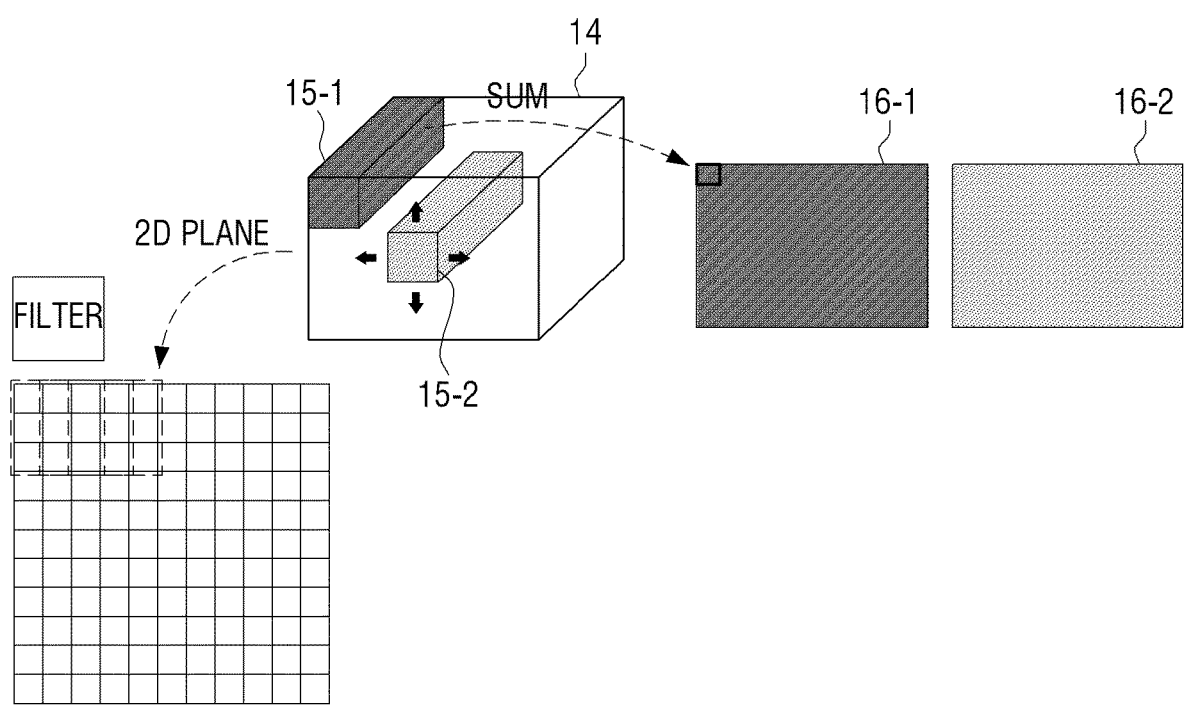
FIGS. 14A and 14B are illustrations of a method of performing a convolution for a feature map having a constant depth.
Figure 14B:
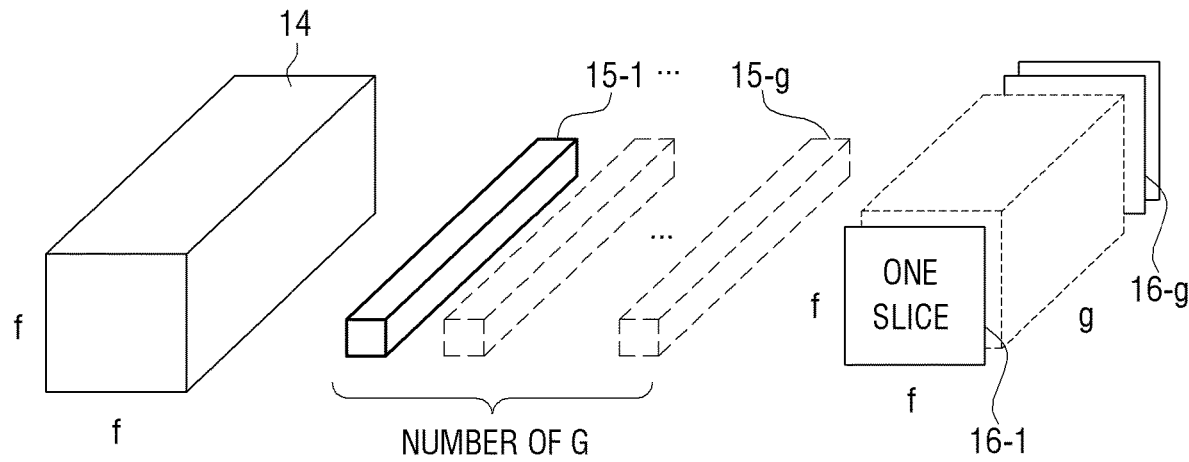

FIGS. 14A and 14B are illustrations of a method of performing a convolution for a feature map having a constant depth.

Referring to FIG. 14A, in a CNN, the feature map 14 may be initially expressed in a three-dimensional matrix by an encoding by Red-Green-Blue (RGB), and a depth thereof may be determined for each of the layers according to the number of applied kernels. That is, the feature map 14 may be expressed in a three-dimensional rectangular parallelepiped. In this case, the filters 15-1 and 15-2 additionally perform the convolution for the depth direction of the feature map 14, and the final value by the convolution becomes one element of new two-dimensional feature maps 16-1 and 16-2.

Referring to FIG. 14B, in a case in which a plurality of filters are present, one slice (feature map) 16-1 to 16-$g$ is derived whenever one filter of g filters 15-1 to 15-$g$ is applied, and a depth of the slice which is finally derived is g.

Figure 15:
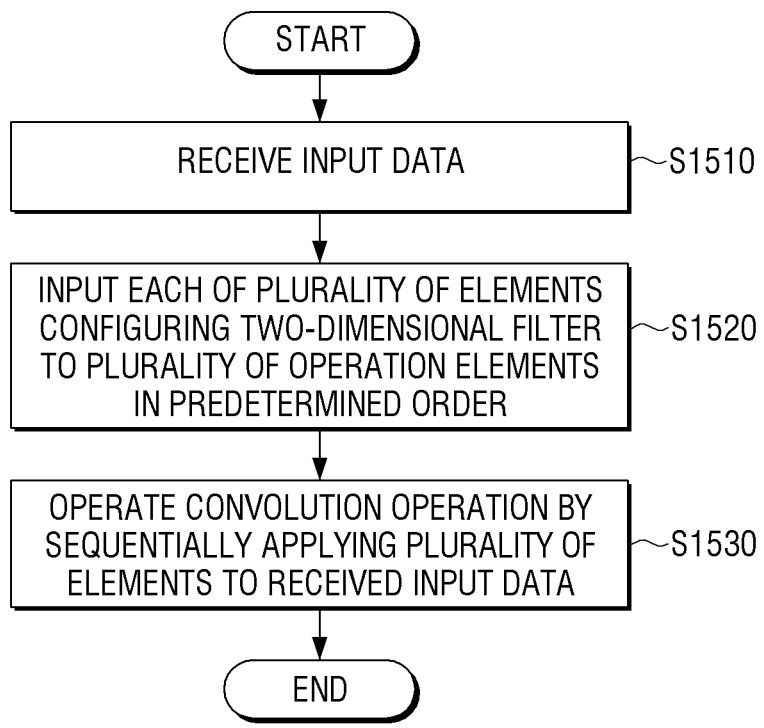
FIG. 15 is a flowchart of a method of performing machine learning, according to an embodiment of the present disclosure.

FIG. 15 is a flowchart of a method of performing machine learning according to an embodiment of the present disclosure.

Referring to FIG. 15, input data is received in step S1510. A plurality of elements configuring a two-dimensional filter is then input to a plurality of processing elements in a predetermined order in step S1520. In this case, each of the plurality of elements is one-dimensional data which is arranged in a predetermined order.

Next, a convolution operation is performed by sequentially applying the plurality of elements to the received input data in step S1530. In this case, the convolution operation may be performed by applying each of the plurality of elements to two-dimensional or three-dimensional input data.

Further, the two-dimensional filter may be divided into the plurality of elements, and the remaining elements except for the elements having zero value among the plurality of elements may be input to the plurality of processing elements in a predetermined order. In this case, the convolution operation may be performed by transferring the accumulation for values obtained by multiplying different data values of the input data with each of the plurality of elements to an adjacent processing element.

For example, an operation of multiplying a first element of the plurality of elements with each of a plurality of first data values belonging to a first row of the input data may be performed, and an operation of multiplying the first element with each of a plurality of second data values belonging to a second row of the input data may be performed. Further, an operation of multiplying a second element of the plurality of elements with each of a plurality of first data values is performed, and an operation of multiplying the second element with each of the plurality of second data values may be performed.

Thereafter, when the operation for the first element is completed and the operation for the second element starts in the first row, a plurality of operation values for the first element may be shifted in a predetermined direction to perform the accumulation for the operation values. In this case, the predetermined direction is a direction in which the second element is disposed based on the first element in the two-dimensional filter.

For example, the predetermined direction is a direction in which the order proceeding in one side direction based on a certain element in the two-dimensional filter, proceeding to an element which is adjacent to a corresponding element in a next row or a next column of the element positioned at the end of the proceeding direction, and proceeding in a direction opposite to one side direction in the adjacent element is repeated.

Further, the plurality of processing elements may form a network having a structure in which the tree topology network is coupled to the mesh topology network. By using the network having such coupled structure, the convolution operation according to the CNN algorithm or the operation according to the RNN algorithm may be performed. For example, the operation according to the mesh topology network may be performed in the convolution layer and the pooling layer of the CNN algorithm, and the operation according to the tree topology network may be performed in the fully connected layer of the CNN algorithm and each layer of the RNN algorithm.

As described above, according to an embodiment of the present disclosure, in performing machine learning for data such as an image, voice, and the like, it is possible to increase to operational speed and efficiency, and the number of PE elements necessary for machine learning is reduced by the integrated network structure of the PE elements, thereby making it possible to reduce cost.

The method of performing machine learning according to an embodiment described above may be implemented in a program and may be stored in various non-transitory computer-readable recording mediums. That is, computer programs processed by a variety of processors to execute the various methods for performing machine learning described above may also be used in a state in which they are stored in the non-transitory computer-readable recording medium.

For an example, a non-transitory computer readable recording medium having a program stored thereon may be provided, wherein the program includes receiving input data, inputting a plurality of elements configuring a two-dimensional filter to a plurality of processing elements in a predetermined order, and performing a convolution operation by sequentially applying the plurality of elements to the received input data.

The non-transitory computer-readable recording medium is not a medium that stores data for a short period of time, such as a register, a cache, a memory, or the like, but indicates a medium that semi-permanently stores data and is readable by a device. For example, the various applications or programs described above may be stored and provided in the non-transitory computer-readable recording medium such as a compact disk (CD), a digital versatile disk (DVD), a hard disk, a Blu-ray disk, a universal serial bus (USB), a memory card, a read only memory (ROM), and the like.

Hereinabove, although the embodiments of the present disclosure have been shown and described, it should be understood that the present disclosure is not intended to be limited to the disclosed embodiments but may be variously changed without departing from the scope and spirit of the present disclosure. Therefore, the present disclosure should be construed as including all changes, equivalents, and substitutions included in the scope of the present disclosure as defined by the appended claims and their equivalents.

What is claimed is:

1. An electronic apparatus for performing machine learning, the electronic apparatus comprising:
   an integrated circuit configured to include a plurality of processing elements arranged in a predetermined pattern and share data between the plurality of processing elements which are adjacent to each other to perform an operation; and
   a processor configured to:
   control the integrated circuit to perform a convolution operation by applying a filter to input data,
   wherein the processor is configured to divide a two-dimensional filter into a plurality of elements which is one dimensional data by arranging the plurality of elements including the two-dimensional filter in a predetermined order,
   identify a plurality of elements, except for at least one element having a zero value among the plurality of elements,
   control the integrated circuit to perform the convolution operation by inputting each of the identified plurality of elements to the plurality of processing elements in the predetermined order and sequentially applying the identified plurality of elements to the input data,
   perform an operation of multiplying a first element of the identified plurality of elements with each of a plurality of first data values belonging to a first row of the input data, perform an operation of multiplying the first element of the identified plurality of elements with each of a plurality of second data values belonging to a second row of the input data, and an operation of multiplying a second element of the identified plurality of elements with each of the plurality of first data values,
   perform an operation of multiplying the second element with each of the plurality of second data values,
   when the operation for the first element is completed and the operation for the second elements starts in the first row, shift a plurality of operation values for the first element in a predetermined first direction by a predetermined first interval,
   perform an accumulation for operation values for the first element and operation values for the second element and obtain first accumulation values, and
   shift the first accumulation values in a predetermined second direction by a predetermined second interval in the integrated circuit,
   wherein the predetermined first direction is a direction for a position in which the second element is disposed based on a position in which the first element is disposed in the two-dimensional filter and the predetermined first interval is determined according to a number of the zero values existing between the position of the first element and the position of the second element in the plurality of elements arranged in a predetermined order,
   wherein the predetermined second direction is a direction in which a third element is disposed based on the second element in the two-dimensional filter and the predetermined second interval is determined based on a number of the zero values existing between the second element and the third element, wherein the plurality of processing elements form a network having a structure in which a tree topology network is coupled to a mesh topology network, wherein the processor is further configured to control the plurality of processing elements to perform operations according to a convolutional neural network (CNN) algorithm and a recurrent neural network (RNN) algorithm using the network having the coupled structure, and wherein the processor is further configured to control the plurality of processing elements to perform operations according to the mesh topology network in a convolution layer and a pooling layer of the CNN algorithm and perform an operation according to the tree topology network in a fully connected layer of the CNN algorithms and each layer of the RNN algorithm.

2. The electronic apparatus of claim 1, wherein the processor controls the integrated circuit to perform the convolution operation by applying each of the identified plurality of elements to two-dimensional or three-dimensional input data.

3. The electronic apparatus of claim 1, wherein the processor is further configured to control the integrated circuit to perform the convolution operation by transferring an accumulation of values obtained by multiplying different data values of the input data with each of the identified plurality of elements to an adjacent processing element.

4. The electronic apparatus of claim 1, wherein the processor is further configured to shift an operation value used in each row for the input data in a predetermined direction to perform an accumulation of operation values, wherein the predetermined direction is a direction in which the order proceeding in one side direction is based on a certain element in the two-dimensional filter, proceeds to an element which is adjacent to a corresponding element in a next row or a next column of the element positioned at the end of the proceeding direction, and proceeds in a direction opposite to one side direction in the adjacent element.

5. A method of performing machine learning using an integrated circuit configured to include a plurality of processing elements arranged in a predetermined pattern and share data between the processing elements which are adjacent to each other to perform an operation, the method comprising:

receiving input data; and performing a convolution operation by applying a filter to the input data, wherein performing the convolution operation comprises:
dividing a two-dimensional filter into a plurality of elements which is one dimensional data;
identifying a plurality of elements, except for at least one element having a zero value among the plurality of elements;
arranging the identified plurality of elements in a predetermined order;
performing the convolution operation by inputting each of the identified plurality of elements to the plurality of processing elements in a predetermined order and sequentially applying the identified plurality of elements to the input data,
multiplying a first element of the identified plurality of elements by each of a plurality of first data values belonging to a first row of the input data and multiplying the first element of the identified plurality of elements by each of a plurality of second data values belonging to a second row of the input data; and
multiplying a second element of the identified plurality of elements by each of the plurality of first data values and multiplying the second element by each of the plurality of second data values, wherein multiplying the second element of the identified plurality of elements further includes shifting a plurality of operation values for the first element in a predetermined first direction by a predetermined first interval when the operation for the first element is completed and the operation for the second elements starts in the first row and performing an accumulation for operation values for the first element and operation values for the second element and obtaining first accumulation values, shifting the first accumulation value in a predetermined second direction by a predetermined second interval in the integrated circuit, wherein the predetermined first direction is a direction for a position in which the second element is disposed based on a position in which the first element is disposed in the two-dimensional filter and the predetermined first interval is determined according to a number of the zero values existing between the position of the first element and the position of the second element in the plurality of elements arranged in a predetermined order, wherein the predetermined second direction is a direction in which a third element is disposed based on the second element in the two-dimensional filter and the predetermined second interval is determined based on a number of the zero values existing between the second element and the third element, wherein the plurality of processing elements form a network having a structure in which a tree topology network is coupled to a mesh topology network, and performing the convolution operation includes performing an operation according to a convolutional neural network (CNN) algorithm or an operation according to a recurrent neural network (RNN) algorithm using the network having the coupled structure, wherein performing the convolution operation includes performing operations according to the mesh topology network in a convolution layer and in a pooling layer of the CNN algorithm, and wherein an operation according to the tree topology network is performed in a fully connected layer of the CNN algorithm and each layer of the RNN algorithm.

6. The method of claim 5, wherein the convolution operation is performed by applying each of the plurality of elements to two-dimensional or three-dimensional input data.

7. The method of claim 5, wherein the convolution operation is performed by transferring an accumulation for values obtained by multiplying different data values of the input data with each of the plurality of elements to an adjacent processing element.

8. The method of claim 5, wherein performing the convolution operation includes shifting an operation value operated in each row for the input data in a predetermined direction to perform an accumulation for operation values, and wherein the predetermined direction is a direction in which the order proceeding in one side direction is based on a certain element in the two-dimensional filter, proceeding to an element which is adjacent to a corresponding element in a next row or a next column of the element positioned at an end of the proceeding direction, and proceeding in a direction opposite to one side direction in the adjacent element.

9. A non-transitory computer-readable recording medium having a program stored thereon, the program for performing machine learning using an integrated circuit configured to include a plurality of processing elements arranged in a predetermined pattern and share data between the processing elements which are adjacent to each other to perform an operation, wherein the program includes:

receiving input data; and performing a convolution operation by applying a filter to the input data, wherein performing the convolution operation comprises:
dividing a two-dimensional filter into a plurality of elements which is one dimensional data;
identifying a plurality of elements, except for at least one element having a zero value among the plurality of elements;
arranging the identified plurality of elements in a predetermined order;
performing the convolution operation by inputting each of the identified plurality of elements to the plurality of processing elements in a predetermined order and sequentially applying the identified plurality of elements to the input data,
multiplying a first element of the identified plurality of elements by each of a plurality of first data values belonging to a first row of the input data and multiplying the first element of the identified plurality of elements by each of a plurality of second data values belonging to a second row of the input data; and
multiplying a second element of the identified plurality of elements by each of the plurality of first data values and multiplying the second element by each of the plurality of second data values, wherein multiplying the second element of the identified plurality of elements further includes shifting a plurality of operation values for the first element in a predetermined first direction by a predetermined first interval when the operation for the first element is completed and the operation for the second elements starts in the first row and performing an accumulation for operation values for the first element and operation values for the second element, and obtaining first accumulation values, shifting the first accumulation value in a predetermined second direction by a predetermined second interval in the integrated circuit wherein the predetermined first direction is a direction for a position in which the second element is disposed based on a position in which the first element is disposed in the two-dimensional filter and the predetermined first interval is determined according to a number of the zero values existing between the position of the first element and the position of the second element in the plurality of elements arranged in a predetermined order, wherein the predetermined second direction is a direction in which a third element is disposed based on the second element in the two-dimensional filter and the predetermined second interval is determined based on a number of the zero values existing between the second element and the third element, wherein the plurality of processing elements form a network having a structure in which a tree topology network is coupled to a mesh topology network, and performing the convolution operation includes performing an operation according to a convolutional neural network (CNN) algorithm or an operation according to a recurrent neural network (RNN) algorithm using the network having the coupled structure, wherein performing the convolution operation includes performing operations according to the mesh topology network in a convolution layer and in a pooling layer of the CNN algorithm, and wherein an operation according to the tree topology network is performed in a fully connected layer of the CNN algorithm and each layer of the RNN algorithm.

* * * * *